United States Patent [19]
Matsuda et al.

[11] Patent Number: 5,852,728
[45] Date of Patent: Dec. 22, 1998

[54] UNINTERRUPTIBLE CLOCK SUPPLY APPARATUS FOR FAULT TOLERANT COMPUTER SYSTEM

[75] Inventors: Koji Matsuda, Hitachinaka; Soichi Takaya, Hitachi; Yoshihiro Miyazaki, Hitachi; Kenichi Kurosawa, Hitachi; Shinichiro Yamaguchi, Mito; Sako Ishikawa, Hadano; Akira Yamagiwa, Ooiso; Masao Inoue, Sagamihara; Kenji Kashiwagi, Minamiashigara, all of Japan

[73] Assignee: Hitachi, Ltd., Tokyo, Japan

[21] Appl. No.: 585,344

[22] Filed: Jan. 11, 1996

[30] Foreign Application Priority Data

Jan. 12, 1995 [JP] Japan .................................. 7-003067
Jun. 9, 1995 [JP] Japan .................................. 7-142891

[51] Int. Cl.$^6$ ........................................................ G06F 1/06
[52] U.S. Cl. ......................................... 395/556; 395/181
[58] Field of Search ................................... 395/551, 552, 395/555, 556, 559, 560, 181, 182.1

[56] References Cited

U.S. PATENT DOCUMENTS 5,422,915  6/1995  Byers et al. ............................. 375/357
5,557,623  9/1996  Driscoll .................................... 371/61
5,568,097  10/1996  Woodman, Jr. ............................ 331/2
5,623,223  4/1997  Pasqualini ............................. 327/298

FOREIGN PATENT DOCUMENTS 1140216A   6/1989  Japan .
1189220A   7/1989  Japan .
 234055A   2/1990  Japan .
3266011A  11/1991  Japan .
4241010A   8/1992  Japan .

*Primary Examiner*—Dennis M. Butler
*Attorney, Agent, or Firm*—Kenyon & Kenyon

[57] ABSTRACT

The present invention concerns clock source switchover between dual clock sources in the event of failure of any of them without affecting the clock output in the dual system, thereby preventing malfunctioning of processors therein. In the fault tolerant computer system of the invention, each of the plural processing units comprises a clock source, a clock selector, a clock stop detection unit, a clock phase adjusting unit, and a phase coincidence detection/operation suppression/resetting unit, whereby when switching over from a faulty clock source to a normal clock source in the event of clock failure, the clock phase adjusting unit ensures continuity in the output clock signals. The clock phase adjusting unit provided in the subsequent stage of the clock selector inserts the PLL circuit having an overdamping response characteristic obtained by lowering the gain of its loop filter.

4 Claims, 22 Drawing Sheets

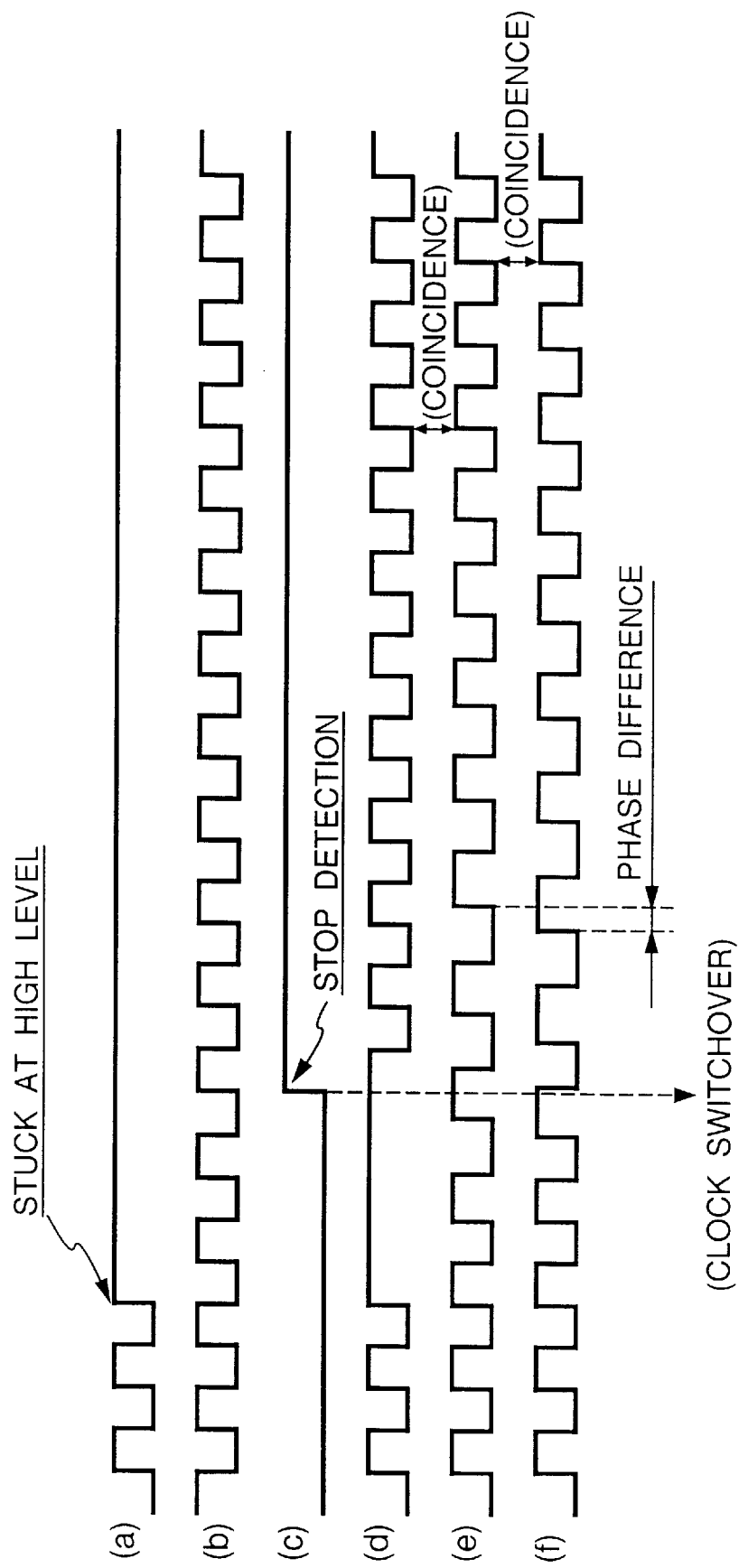

UNINTERRUPTIBLE CLOCK SUPPLY APPARATUS FOR FAULT TOLERANT COMPUTER SYSTEM

FIELD OF INDUSTRIAL APPLICATION

The present invention relates to all types of processing units having a plurality of oscillation circuits, and in particular, it relates to a clock signal supply system for use in a fault tolerant computer system having a plurality of processing units which operate in synchronism with each other on clock signals in a same phase, as well as a resynchronizing operation process of resuming a synchronizing operation between the plurality of processing units after replacement or switchover of a faulty clock upon detection thereof.

BACKGROUND OF THE INVENTION

As a conventional clock supply apparatus for use in a fault tolerant computer system, there is such an apparatus as disclosed in JP-A No. 2-34055, in which a single unit of clock signal generator supplies clock signals to all units in the system. However, there is such a drawback that if the clock signal generator should fail, the entire system will go down.

Thereby, as disclosed in JP-A No. 3-266011, a system has been proposed for maintaining a normal clock output in a clock signal generation unit including a plurality of clock signal sources therein by taking a majority decision when one of the plurality of clock signal sources fails. However, there has not been recited nor suggested any step of replacement or switchover of the faulty members.

Further, another method disclosed in JP-A No. 1-140216 proposes that in a system including a plurality of processing units which operate in synchronization with each other and which require a pair of a fundamental clock signal and its integer-multiplied clock signal, if any of the clock therein fails, and when the failed clock is switched over to another normal pair of fundamental clock and its integer-multiplied clock, a prior phase relationship existing between the fundamental clock and its integer-multiplied clock is maintained after the switching over therebetween. However, output clock supply during clock switching therebetween is interrupted.

Conventionally, when a faut occurs in one of a plurality of clock circuits in a multiple configuration in a fault tolerant computer system, the faulty clock must be switched over by interrupting operation of the system. Further, at the time of switching over from the faulty clock to a normal clock by means of a clock switching device, a clock supply to processors is interrupted for several cycles, or the clock cycle thereof is caused to extend at least for one cycle compared to the inherent cycle, thereby causing its frequency to decrease even though it is for a short period of time, thereby there is likely to result in a malfunction in the processors due to data pass through of data latch element in the processor, or evaporation of memory contents in dynamic memory and the like.

Further, simply to switch over between two or more clock generation sources will cause a spikewise noise to occur when the clock sources to be switched are not synchronous. A conventional method to prevent such spikewise noise is proposed in JP-A No. 1-189220. In this prior art, a switching timing is adapted to synchronize with another clock generation source selected in order to prevent such a spikewise noise from occurring due to switchover.

Still further, as another related prior art there is such one as disclosed in JP-A No. 4-241010, which has a function, in addition to simply switching over between clock generation sources, to detect stoppage of a faulty clock generation source then switch to another clock generation source which is operating normally. In this prior art, there are provided duplex clock signal generators and a stop detection circuit which monitors oscillation conditions of one clock generator with reference to the other clock generator, whereby upon detection of abnormality taking place in the one clock generator, the clock source is switched over to the other clock generator so that uninterruptible clock output is ensured throughout the system operation.

However, there are such problems associated with the foregoing prior art as follows. According to the prior art disclosed in JP-A No. 1-189220, although the spikewise noise due to switchover between clock sources can be suppressed, switching timing for switchover between clock generators must be controlled accurately, and in addition, duty cycle of the clock output during the switching is not always guaranteed. In the case the duty cycle is not guaranteed, since the operation at a clock supply destination may not be guaranteed, an additional process is required at the clock supply destination such as to interrupt its operation during clock switchover.

Further, the prior art disclosed in JP-A No. 3-7523 which is provided with the stop detection circuit which monitors oscillation conditions of respective clock sources, and upon detection of stoppage of any of the clock sources, switches over to another clock source to continue its clock supply. However, its clock output remains fixed during a period of time from the stoppage of a faulty clock source followed by a detection of the stoppage by the stop detection circuit, to switching over from the faulty clock to another clock source.

Since it takes at least 2–3 cycles or more to go through from the stop detection to the clock switchover as described above, in case continuity in clock supply cannot be ensured at the clock supply destination, nevertheless, the operation at the clock supply destination will have to be interrupted, and it is more difficult to determine at which timing it should be interrupted.

Further, with an increasing speed of operation required for the processors at the clock supply destination, a faster clock speed is required, and since the clock supply destinations are becoming versatile, clock processing therebetween is becoming more difficult.

BRIEF DESCRIPTION OF THE DRAWINGS

Other and further objects, features and advantages of the invention will appear more fully from the following description taken in conjunction with the accompanying drawings wherein;

FIG. 23 is a time chart indicative of operation of the clock distribution system of FIG. 22.

SUMMARY OF THE INVENTION

Figure 1:
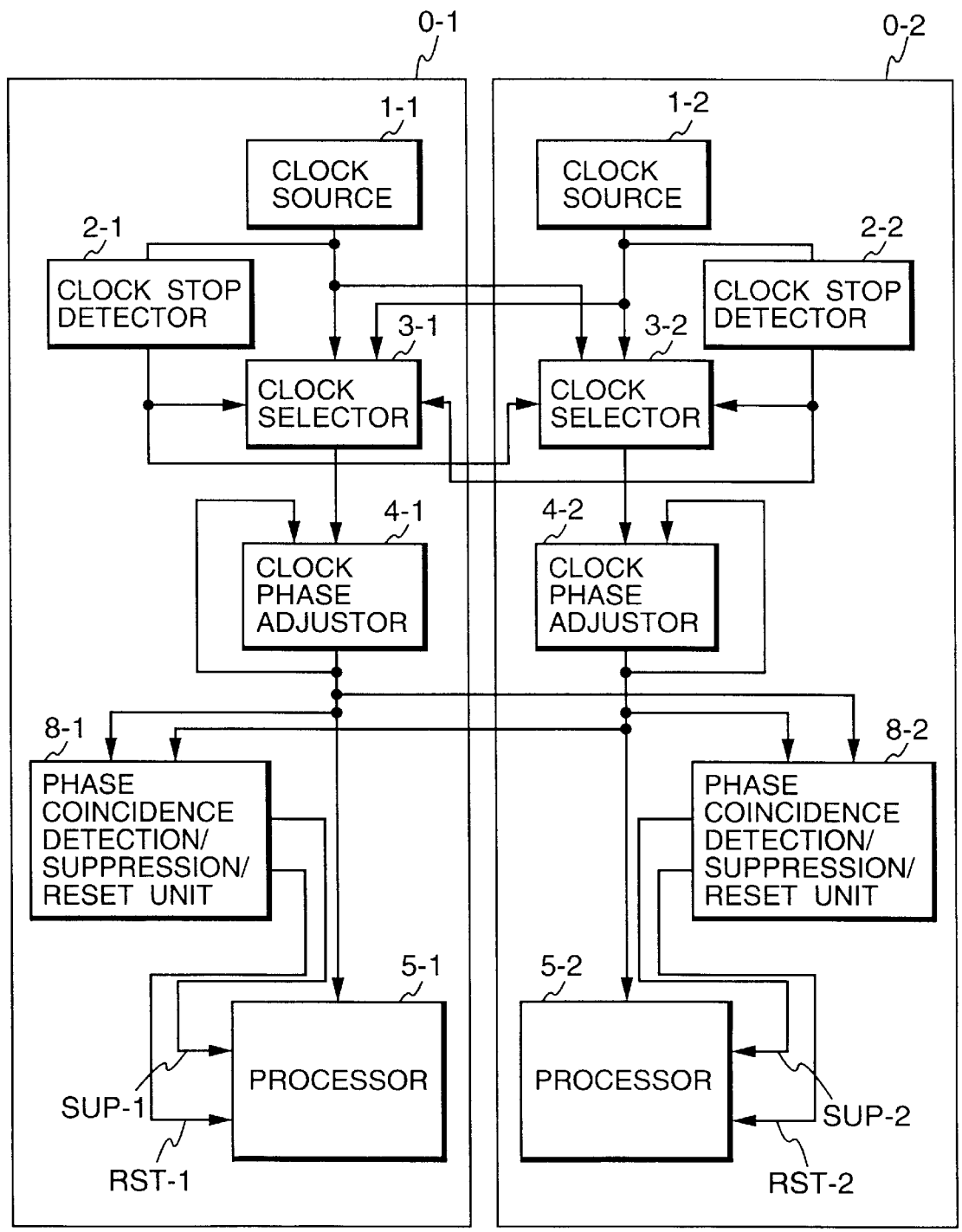
FIG. 1 is a schematic block diagram indicative of a fault tolerant computer system of the invention.

In a multiple computer system according to the invention including a plurality of processing units for executing the same processing in parallel, wherein each processing unit comprises a clock source having a same output frequency between the plurality of processing units, a processor operating on the same frequency supplied from the clock source, a clock selector which enters as its input clock signals from the clock source provided therein and from another clock source provided in another processing unit and selects an appropriate clock signal from either one of clock sources which can serve as a common clock source for the plurality of processing units operating in synchronism, a clock stop detection unit which enters as its input clock signals from respective clock sources in respective processing units and upon detection of a failure of clock oscillation in its own clock source, which is determined with reference to the other clock source, to produce a selection switching command to respective selection units in respective processing units, and a clock phase adjustment means which enters as its input an output clock from the foregoing clock selection unit, and when the phase of its input clock does not coincide with the phase of the clock prior to switching, the phase of its output clock is caused to shift gradually taking several cycles from that prior to switching to that after switching or desired.

Normally, this clock phase adjustment means enters as its input the selected clock output from the clock selection unit and outputs a clock signal having the same phase as the input clock, however, when the clock supply is caused to interrupt for several cycles during clock switchover, or when the phase of input clock is caused to change, it is adapted to produce its output clock in such a manner that the phase of its output clock is changed gradually from that prior to switchover to coincide with the phase of the clock signal after switchover, and that a frequency change in a clock supply to the processor is suppressed to a minimum level to ensure the operation of the processor and prevent malfunction of respective processing units.

The processing unit of the invention further includes phase coincidence detection means for detecting whether or not a clock phase after having been switched from the faulty clock coincides with a phase of an updated clock which is normal, operation suppression means which outputs a signal to suppress the operation of the processor therein when the clock of which is replaced until the phase of its updated clock coincides with the other clock phase in the other processing units, and reset means for resetting all the processing units in the system upon coincidence of the clock phases after a predetermined period of time.

Thereby, even when a clock fault occurs in one of the plurality of the processing units in the multiple computer system, it is possible to replace only the faulty clock on-line by turning off a faulty processing unit while allowing the rest of the plurality of the processing units which are normal to keep operating using a clock source of its own or the other, then, after replacement or switchover of the faulty clock and upon coincidence of all the phases of input clocks to the processors, all the processing units are reset to resume their operations in synchronism with the selected clock.

Further, there are provided a stop detection circuit which monitors the plurality of clock sources and oscillation conditions thereof, a switching circuit which, in response to a condition of the stop detection circuit or other control signals, selects an appropriate clock source to take over clock output, and a phase-locked loop (PLL) circuit which is comprised of a phase comparator, a loop filter and a voltage control oscillator.

Then, the phase comparator of this PLL circuit enters as its input a reference signal input from external and a feedback signal output from the voltage control oscillator, and outputs an error signal which is a difference in phase between the reference signal and the feedback signal to the loop filter which removes a high frequency component in the error signal, and outputs only a DC component of the error signal to the voltage control oscillator. The voltage control oscillator is adapted to correct its oscillation in response to an output from the loop filter. Through repetition of a series of such operation, this PLL circuit can adapt the phase and frequency of its feedback signal to coincide with those of the reference signal at the input portion of the phase comparator.

This PLL circuit is inserted in the subsequent stage of the clock switchover circuit. When the clock switchover circuit is caused to switch from one clock source to another clock source in response to a control signal from an upper processing unit, the phase of a reference signal to be supplied to PLL circuit may change dynamically, however, a feedback signal to be output from the PLL circuit is not adjusted as dynamically and as quickly so as to be in phase with the reference signal instantly. A correction quantity for the feedback signal is determined by respective gains of the phase comparator, loop filter and voltage control oscillator used, thereby the correction quantity can be adjusted, for example, by adjusting a gain of the loop filter. By lowering the gain of the loop filter, it is possible for an error quantity in an output from the phase comparator to be reduced in the loop filter itself so as to suppress an output correction in the voltage control oscillator. Then, by adjusting a correction quantity in an output from the PLL circuit required due to interclock switchover to such a level that operation consistency is ensured at the clock supply destination, the operation at the clock supply destination can be continued without interruption even during the clock switching operation.

Characteristic of any PLL circuit, the PLL circuit oscillate an appropriate frequency by itself when no reference signal is input, which is called self oscillation frequency. When a frequency in the reference signal is lost, the feedback signal from the PLL circuit changes its output frequency gradually to that of the self oscillation frequency of its own. For the PLL circuit disposed in the subsequent stage of the clock switch circuit, this state of transition described above coincides with a period of time including several cycles from detection of stoppage of its clock source by the stop detection circuit to switchover to another clock source selected by the switching circuit. Even for this transitional state, by lowering the gain of the loop filter so that pull-in characteristics of the PLL circuit becomes overdamping, it can be arranged for an output frequency from the PLL circuit not to change abruptly from that of the original clock source during switching between clock sources. Further, since it is arranged such that differences in frequency and phase between respective clock sources before and after switchover are caused to change through gradual corrections, the clock supply destination can keep operating without apparently noticing stoppage of its clock source nor switchover between respective clock sources.

DETAILED DESCRIPTION OF EMBODIMENTS

With reference to the accompanying drawings, embodiments of the invention will be described in detail in the following.

FIG. 1 is a schematic block diagram indicative of a fault tolerant computer system according to the invention. For simplification of description, the invention will be described by way of example of a dual type fault tolerant computer system which includes two parallel processing units. Each of dual type processing units 0-1, 0-2 of the system comprises a clock source (1-1, 1-2), a clock stoppage detection unit (2-1, 2-2), a clock selection unit (3-1, 3-2), a clock phase adjustment unit (4-1, 4-2), and a processor (5-1, 5-2). Normally, a clock signal from either one of clock sources 1-1 and 1-2 is supplied to both of the dual type processing units so that the total system is ensured to execute the same processing in synchronism on the same clock.

Two lines of clock signals from the clock sources 1-1, 1-2 are input to clock selectors 3-1 and 3-2, respectively. An output from clock source 1-1 enters clock stop detection unit 2-1 and an output from clock source 1-2 enters clock stop detection unit 2-2, respectively. Respective clock selectors 3-1, 3-2 select simultaneously the same clock source either one of 1-1 and 1-2, thereby each processing unit of the dual system can operate sharing clock signals from a single clock source. A clock selected and shared by each clock selector enters each clock phase adjustment unit 4-1 or 4-2.

Should a fault occur in any clock, for example, in 1-1 which has been selected by the clock selector 3-1, clock stop detection unit 2-1 provided in the same processing unit as the faulty clock source 1-1, upon detection of clock stoppage in its own system, produces a selection switch over signal for selecting a normal clock instead of the faulty clock to clock selectors 3-1, 3-2 in respective processing units of the dual system. Each clock selector in response to the selection switchover signal switches from the faulty clock to another clock source as an updated clock source to be shared with the other processing unit in the dual system, in consequence, the clock is switched from 1-1 to 1-2. Normally, each of clock phase adjustment units 4-1, 4-2 outputs a clock signal having the same phase as its input clock, however, should there occur a fault in the clock currently in use followed by a switching in the clock selector for switching from the faulty clock to the newly selected clock, it is arranged according to the invention such that the phase of its output clock is adjusted from the clock phase prior to switchover to a clock phase of the newly selected clock source gradually taking several cycles. Thereby, during normal operation, processors 5-1 and 5-2 in respective processing units of the dual system are supplied with a synchronous clock signal supplied from the same clock source. When a failure occurs in the common clock source, phase correction from the phase of the failed clock to that of the newly selected clock source is adjusted to take place gradually over several cycles. Thereby, uninterruptible clock signals which will not cause malfunction in the processors are supplied reliably.

Further, in order to enable resumption of synchronous operation of all the processing units in the dual system after replacement or switchover of the faulty clock, each processing unit further includes a phase coincidence detection/ operation suppression/reset unit (8-1, 8-2). Assuming a fault having occurred in the clock generator 1-1, operation of this phase coincidence detection/operation suppression/reset unit will be described briefly in the following.

After replacement of the failed clock source 1-1 in a system inclusive thereof, when the system is turned on, its clock selector 3-1 is urged to select clock 1-2 in the other normally functioning system. Until it is detected by the phase coincidence detection/operation suppression/reset units 8-1, 8-2 that an adjusted clock phase in 4-1 coincides with the phase of the output clock from the phase adjustment unit 4-2 in the normally functioning system, 8-1 continues to output an operation suppression signal SUP-1 for suppressing operation of processor 5-1. After a predetermined period of time upon detection of phase coincidence both in 8-1 and 8-2, the same produce reset signal RST-1, RST-2 to processing units 5-1 and 5-2 so as to resume their operations in synchronism with each other using the same clock. Thus, the respective processing units of the dual system resume parallel operation to execute the same processing in synchronism with each other using the same clock source.

Figure 2:
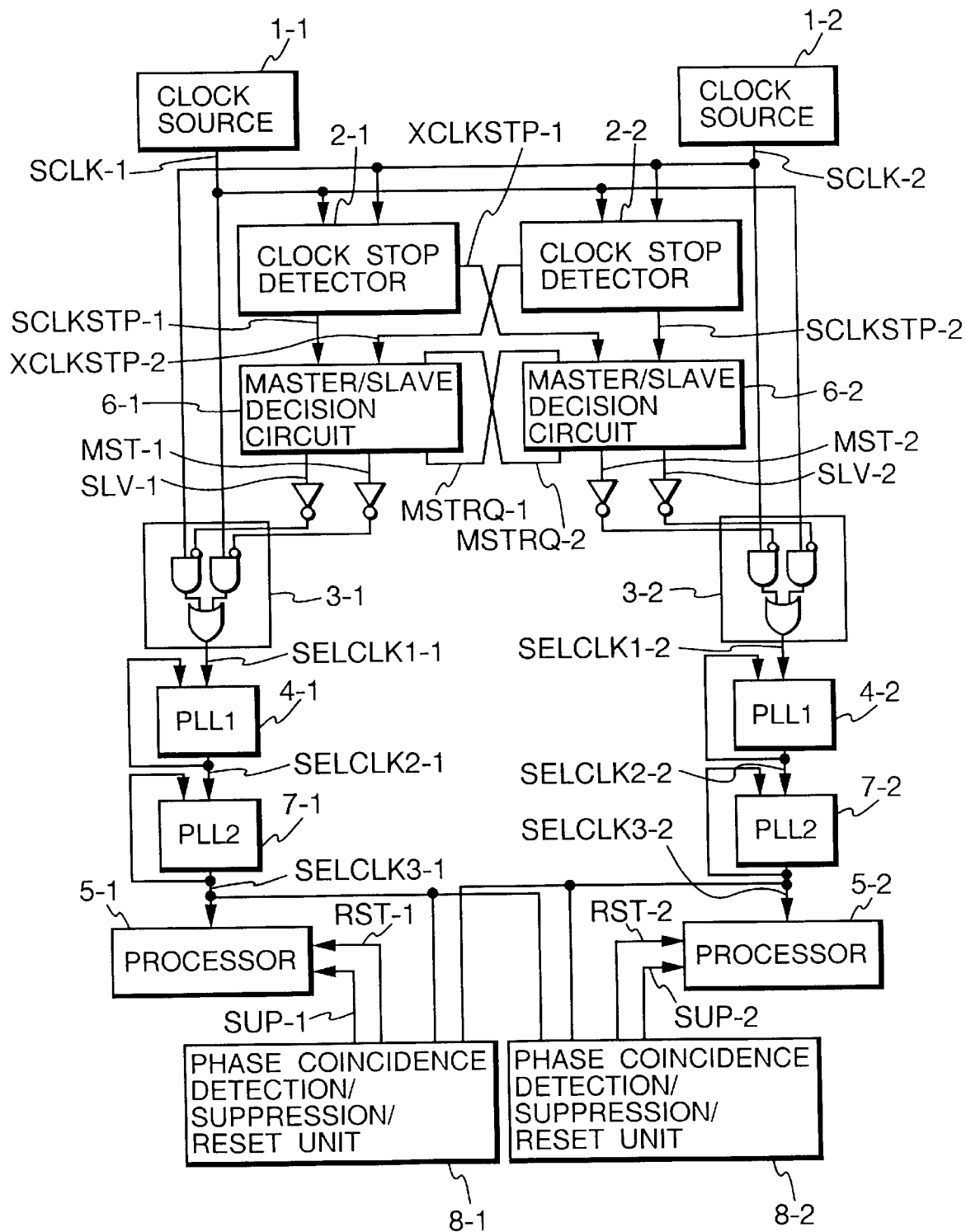
FIG. 2 is a detailed configuration of the fault tolerant computer system of the invention.

With reference to FIG. 2, there is illustrated a detailed arrangement of a fault tolerant computer system of an embodiment of the invention.

Output clocks SCLK-1, SCLK-2 from clock sources 1-1, 1-2 enter both clock stop detection units 2-1, 2-2 and clock selectors 3-1, 3-2, respectively. Detection signals SCLKSTP-1, XCLKSTP-1 and SCLKSTP-2, XCLKSTP-2 indicative of stoppage of its own clock source enter master/ slave decision circuits 6-1, 6-2, respectively. Each of master/ slave decision circuits 6-1, 6-2 has a flip-flop configuration, and turns on signal MSTRQ-1 when the clock in its system is judged to be Master, and turns off signal MSTRQ-2. The master/slave decision circuit determines its clock selection signals MST-1, SLV-1, MST-2, SLV-2 in dependency on whether its own system is master or slave. For example, when signal MSTRQ-1 is ON, MST-1 is ON, SLV-1 is OFF, and MST-2 is OFF, SLV-2 is ON, and thus clock 1-1 is selected.

Selected clock signals SELCLK1-1 and SELCLK1-2 enter clock phase adjustment units (PLL1) 4-1 and 4-2, respectively. Then, 4-1 and 4-2 produce clock SELCLK2-1 and SELCLK2-2 respectively which are corrected to follow up the changes in phase of input clocks taking several cycles, and the result of which are input to phase adjustment units (PLL2) 7-1 and 7-2, respectively. Respective phase adjustment units 7-1 and 7-2 produce output clock signals SELCLK3-1, SELCLK3-2 respectively each having a multiplied frequency of the input clock frequency to processors 5-1 and 5-2, respectively.

Further, in order to enable processors 5-1, 5-2 in respective systems to resume synchronous operation in parallel on the synchronized clock, the processors 5-1 and 5-2 are supplied a signal from phase coincidence detection/operation suppression/reset units 8-1, 8-2. The phase coincidence detection/operation suppression/reset units 8-1, 8-2 enter as its input clock signals SELCLK3-1, SELCLK3-2, detect whether or not the phases of SELCLK3-1 and SELCLK3-2 coincide after faulty clock switchover, produce operation suppression signal SUP-1 or SUP-2 to the processor or in the processing unit in which clock failed, and output reset signals RST-1, RST-2 to all processors for resuming synchronous operation after a predetermined period of time upon detection of phase coincidence.

In this embodiment of the invention, multiple processing functions of clock phase coincidence detection, operation suppression of an associated processor during phase discordance and resetting of the processor upon phase coincidence are described to have been realized by a single unit, however, it is not limited thereto, and they may be realized by separate means each functioning a single task. In such a case, clock signals SELCLK3-1 and SELCLK3-2 will be input to a phase coincidence detection unit, an operation suppression unit will output operation suppression signals SUP-1, SUP-2, and a reset unit will output reset signals RST-1, RST-2. Further, the phase coincidence detection unit will output the result of the phase coincidence detection processing to the operation suppressing unit and the reset unit, respectively.

Figure 3:
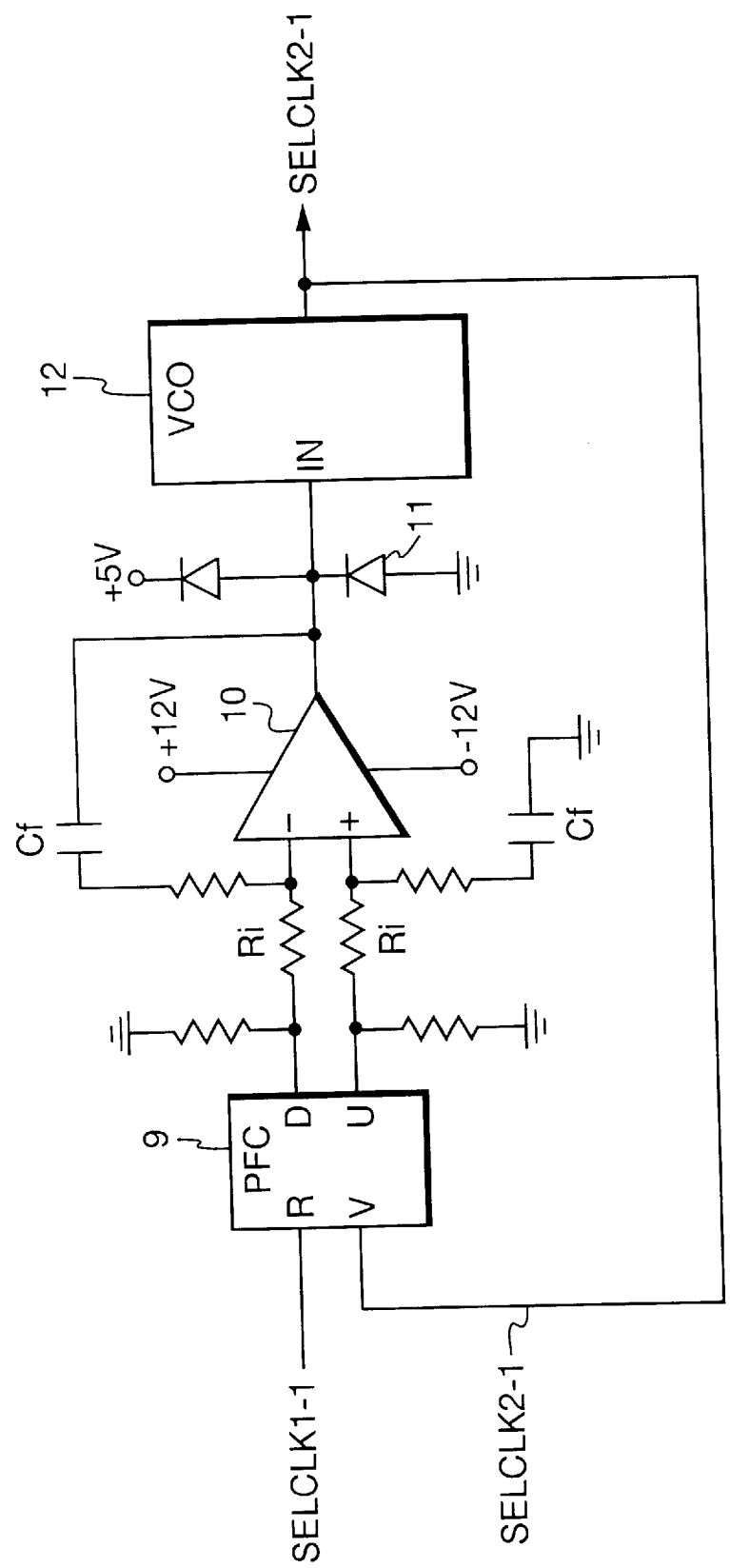
FIG. 3 is a detailed configuration of a clock phase adjustment circuit of the invention.

FIG. 3 is a schematic block diagram illustrative of clock phase adjustment units 4-1, 4-2 more in detail. By way of example of clock phase adjustment unit 4-1, clock signal SELCLK1-1 is input to phase comparator (PFC) 9 through its reference terminal R, and clock SELCLK2-1 which is a feedback signal is input through its feedback terminal V. Phase comparator (PFC) 9 compares phases of both inputs, and if the phase of the feedback clock is, for example, delayed from the phase of the reference clock, PFC9 outputs a corresponding voltage from its terminal U, and its output voltage is input to operational amplifier 10 through its non-inverting input terminal. Operational amplifier 10 produces its output voltage by integrating its input voltage at its output terminal using a time constant determined by resistance Ri and capacitance Cf. An output voltage from operational amplifier 10 is clamped in a predetermined range of voltage, for example, 0–5 V by signal clamp diode 11, then the output voltage is input to voltage control oscillation circuit VCO 12. Voltage control oscillation circuit VCO 12 in turn produces output clock SELCLK2-1 having a frequency corresponding to the input voltage frequency. Since SELCLK2-1 is fed back to phase comparator PFC 9, the phase of SELCLK-2-1 is adapted to coincide with the phase of SELCLK1-1 in consequence. At this time, if the time constant determined according to resistance Ri and capacitance Cf is increased, output clock SELCLK2-1 is adapted gradually to follow up the phase change in input clock SELCLK1-1.

Figure 4:
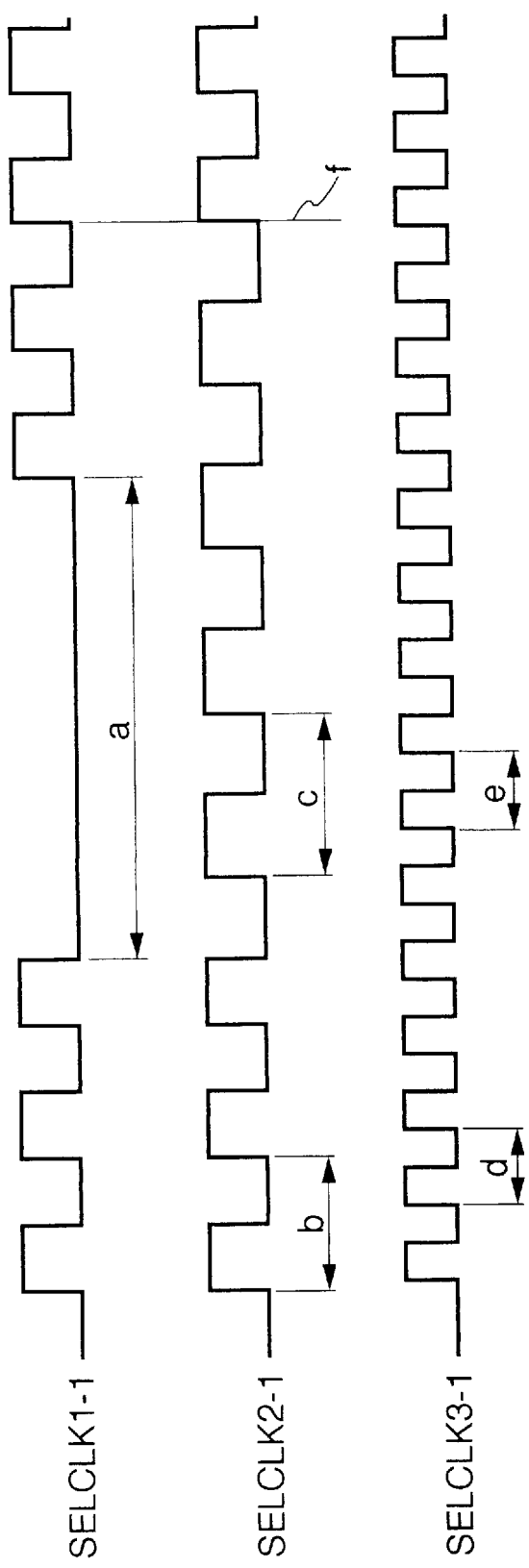
FIG. 4 is a clock time chart during clock switchover according to the invention, FIG. 5 Us a clock time chart immediately after switchover from a faulty clock, FIG. 6 a schematic block diagram indicative of another embodiment of the invention.

With reference to FIG. 4, a time chart is shown indicative of output SELCLK1-1 from clock selector 3-1, output SELCLK2-1 from clock phase adjustor 4-1, and output SELCLK3-1 from clock phase adjustor 4-2, respectively. Upon detection of a fault in SCLK-1, the clock stop detection unit 2-1 described above outputs stoppage detection signals SCLKSTP-1 and XCLKSTP-1 to master/slave decision circuits 6-1, 6-2. As indicated in FIG. 2, respective master/slave decision circuits 6-1, 6-2 produce selection signals MST-1, SLV-1, and MST-2, SLV-2 to clock selection circuits 3-1, 3-2, respectively. At this time, it takes several cycles as indicated in FIG. 4(a) until the faulty clock is switched over to clock SCLK-2 which is selected as a new clock to be shared in common. During this period of time (a), clock input to the clock phase adjustment unit 4-1 is interrupted, however, its clock supply output will not be interrupted even though a cycle (c) of SELCLK2-1 becomes larger than its original cycle (b). Then, the phase of SELCLK2-1 is caused gradually to coincide with the phase f of SELCLK1-1 after input clock SELCLK1-1 is switched over to clock SCLK-2. Further, the frequency of SELCLK2-1 is multiplied twofold by phase adjustment unit 7-1 to produce SELCLK3-1, of which the cycle e becomes larger than its original cycle d, though there will occur no clock stoppage during the switchover period.

Figure 5:
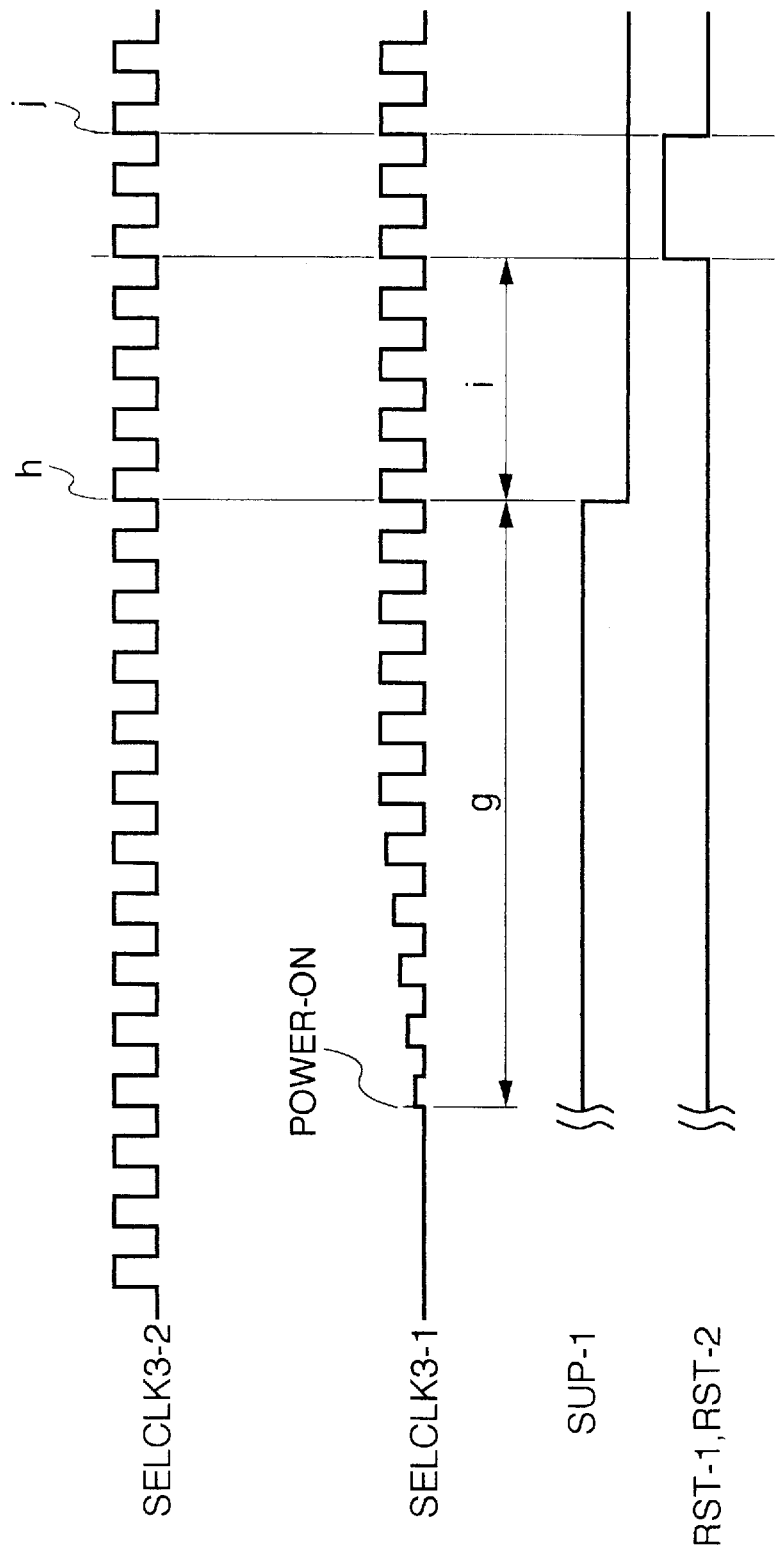

With reference to FIG. 5, there is shown a time chart indicating respective clock cycles after faulty clock 1-1 was replaced upon detection of fault in clock signal SCLK-1. After replacement or switchover of the clock in the faulty clock system and after a period of time g upon turn-on of the system, phases of clocks SELCLK3-1 and SELCLK3-2 in the dual system are adapted to coincide. The phase coincidence detection/operation suppression/reset unit on one of the dual system in which the faulty clock was replaced turns off suppression signal SUP which has suppressed the operation of its own processor at point h at which phases of clocks to be used on both of the dual systems are detected to be identical, thereby allowing respective processors in the dual system to start respective operations using respective clocks of the same phase. At this point, however, both processors are not enabled to execute the same processing yet. In time i after h, 8-1 and 8-2 turn on reset signals RST-1, RST-2 respectively to enable both of the processors 5-1, 5-2 to start in synchronism with each other, thereby at time j after the reset signals are turned off, both of the processors are assumed to have resumed synchronous operation.

Thereby, it is prevented for the clocks to be supplied to the processors from interrupting even when the faulty clock in one of the dual clock systems in the fault tolerant computer system is switched over or replaced by the other.

Figure 6:
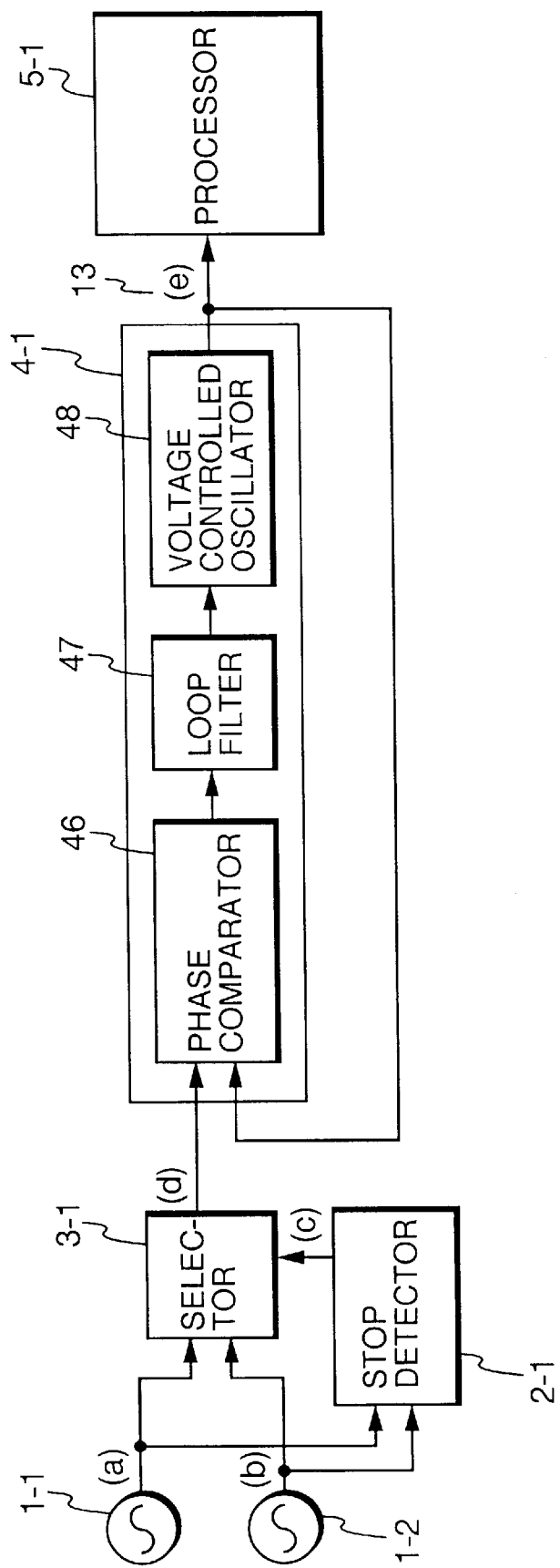

With reference to FIG. 6, there is indicated a schematic block diagram of another embodiment of the invention, indicative of a schematic configuration of a clock switching circuit for use at the time of detection of clock stoppage.

In the drawing of FIG. 6, respective numerals indicate respective components as follows. 1-1:clock source. 1-2: another clock source for producing a clock signal corresponding to that of 1-1. 3-1: selector for selecting either one of clock sources 1-1 and 1-2 for its clock output. 2-1: stop detection circuit which monitors the oscillation condition of clock source 1-1, for example, with reference to clock source 1-2. 4-1: PLL circuit which includes phase comparator 46, loop filter 47 and voltage control oscillator 48. 13: output terminal of the PLL circuit 4-1 to supply clock signals to processor 5-1.

Since stop detection circuit 2-1 will detect nothing abnormal in the initial state, selector 3-1 selects to output as its clock a clock of clock source 1-1. Until the clock of clock generator 1-1 is output from selector 3-1, PLL circuit 4-1 allows its voltage control oscillator 48 to produce a self oscillating frequency part of which is fed back to phase comparator 46. When the output from selector 3-1 is input to a reference terminal of PLL circuit 4-1, phase comparator 46 outputs a phase difference between the reference signal and the feedback signal as an error. Since the error output from phase comparator 46 includes high frequency components, loop filter 47 is provided to cut off the high frequency components and allow only a DC component in the error signal to pass through and enter voltage control oscillator 48 which, then, in response to the DC component is adapted to correct its output as desired. More particularly, the PLL circuit adopted here is such one in which by adjusting the gain of loop filter 47, a correction quantity of the feedback signal output from voltage control oscillator 48 is variably adjusted. By repeating this correction operation, the phase and frequency of the feedback signal is adapted to coincide with the phase and frequency of the reference signal at the input side of the PLL circuit. The foregoing description concerns the transitional circuit operation from the power-on to the normal operation, then, afterward, the phase and frequency of feedback signal always coincide with those of the reference signal at the input side of the PLL circuit in the normal condition. Next, with reference to FIG. 7, transitional operation in the event of failure of clock source 1-1 will be described below.

Figure 7:
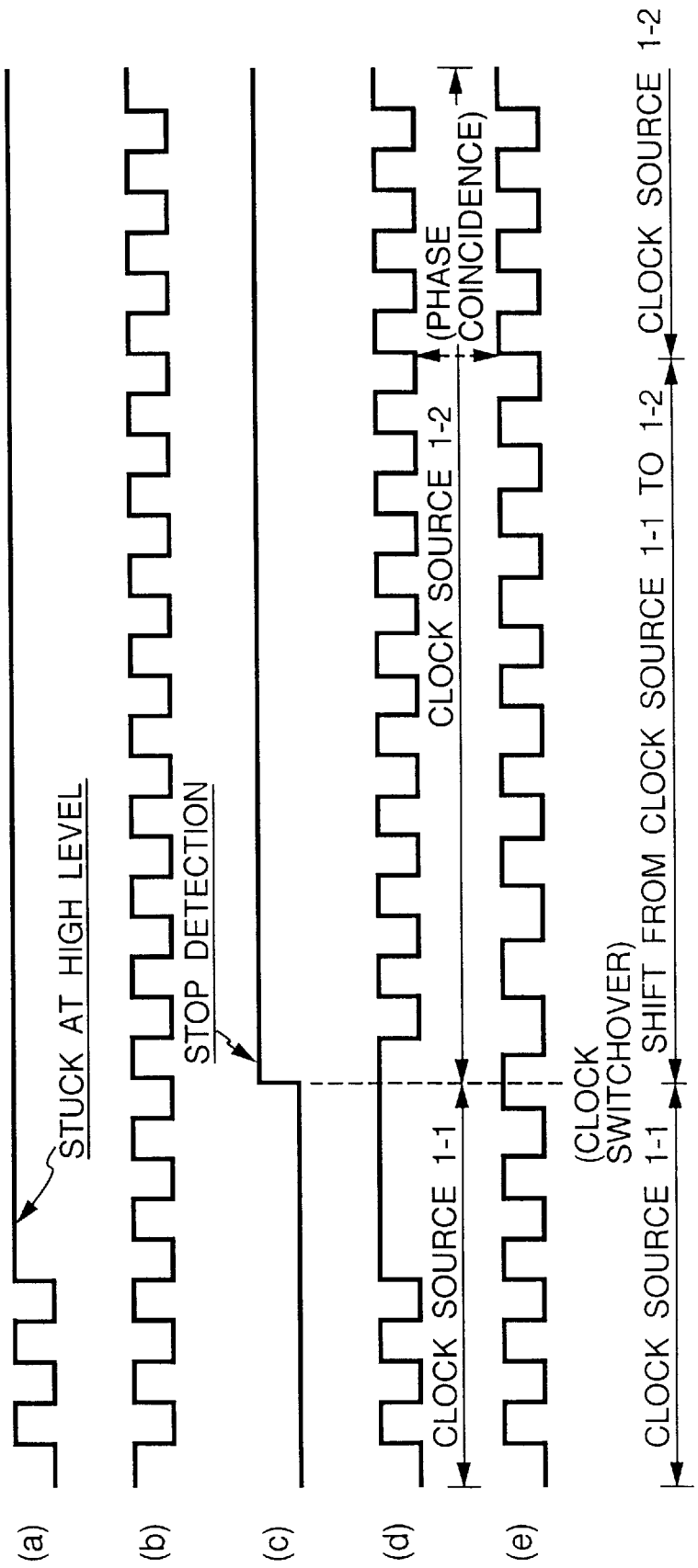
FIG. 7 is a time chart indicative of operation of the embodiment of FIG. 6.

In the drawing of FIG. 7, respective symbols designate respective outputs as follows. (a):output of clock source 1-1. (b):output of clock source 1-2. (c):output of stop detection circuit 2-1. (d): output of selector 3-1. (e):output at clock output terminal 13. FIG. 7 is a time chart indicative of respective operations in the event of failure of clock source 1-1 in which a High level fault occurred as indicated. When clock source 1-1 is at fault to High level, upon detection of stoppage thereof and until stop detection circuit 2-1 completes switchover of the output of selector 3-1 from clock source 1-1 to 1-2, selector 3-1 keeps outputting the High fault clock signal of clock source 1-1. This faulty clock signal enters PLL circuit 4-1 through its reference terminal. Assuming there exists no reference signal, PLL circuit 4-1 corrects the output of voltage control oscillator 48 so that the output thereof approaches its own self oscillating frequency. However, since the gain of loop filter 47 in PLL circuit 4-1 used is lowered, before the output of voltage control oscillator 48 is corrected fully, an output from clock source 1-2 is allowed to enter the reference terminal of PLL circuit 4-1. A clock signal input from clock source 1-2 and a feedback signal from PLL circuit are completely asynchronous, and since there exist some differences in phase and frequency therebetween, PLL circuit 4-1 attempts to correct such differences in phase and frequency between the reference signal and the feedback signal. In this attempt, however, since the gain of the loop filter in the PLL circuit used is lowered, such correction operation as above will be effected slowly through repetition thereof. Due to this delayed effect of correcting operation, detection of clock stoppage and subsequent switchover between the failed clock 1-1 and the normal clock 1-2 can be executed without affecting and being noticed by processor 5-1 at a clock supply destination.

Figure 8:
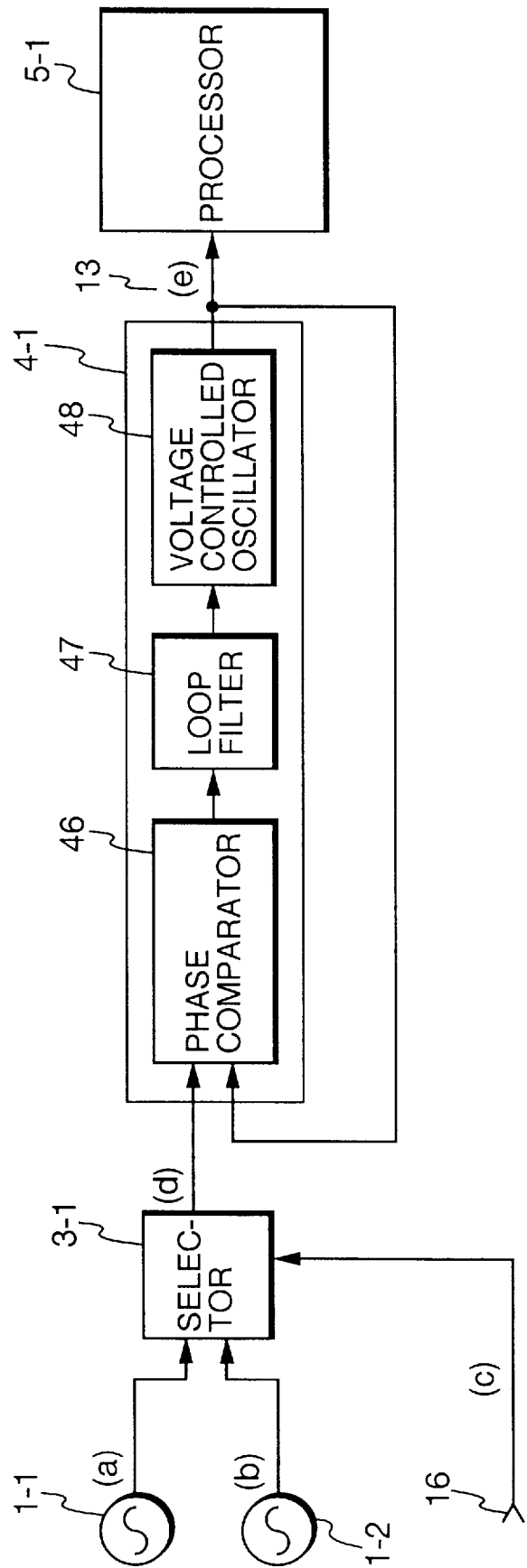
FIG. 8 is a schematic block diagram indicative of still another embodiment of the invention.

With reference to FIG. 8, there is indicated a schematic block diagram of a clock switchover circuit of another embodiment according to the invention. A major difference from the preceding embodiment of the invention resides in that while the preceding embodiment is directed to the clock switchover upon detection of stoppage of the faulty clock source, this embodiment is directed to clock switchover between normally operating clock sources during the normal operation thereof.

In the drawing of FIG. 8, numeral 16 denotes an input terminal for selecting one of clock sources to output from selector 3-1. Switchover operation in this embodiment of the invention will be described in the following with reference to FIG. 9.

Figure 9:
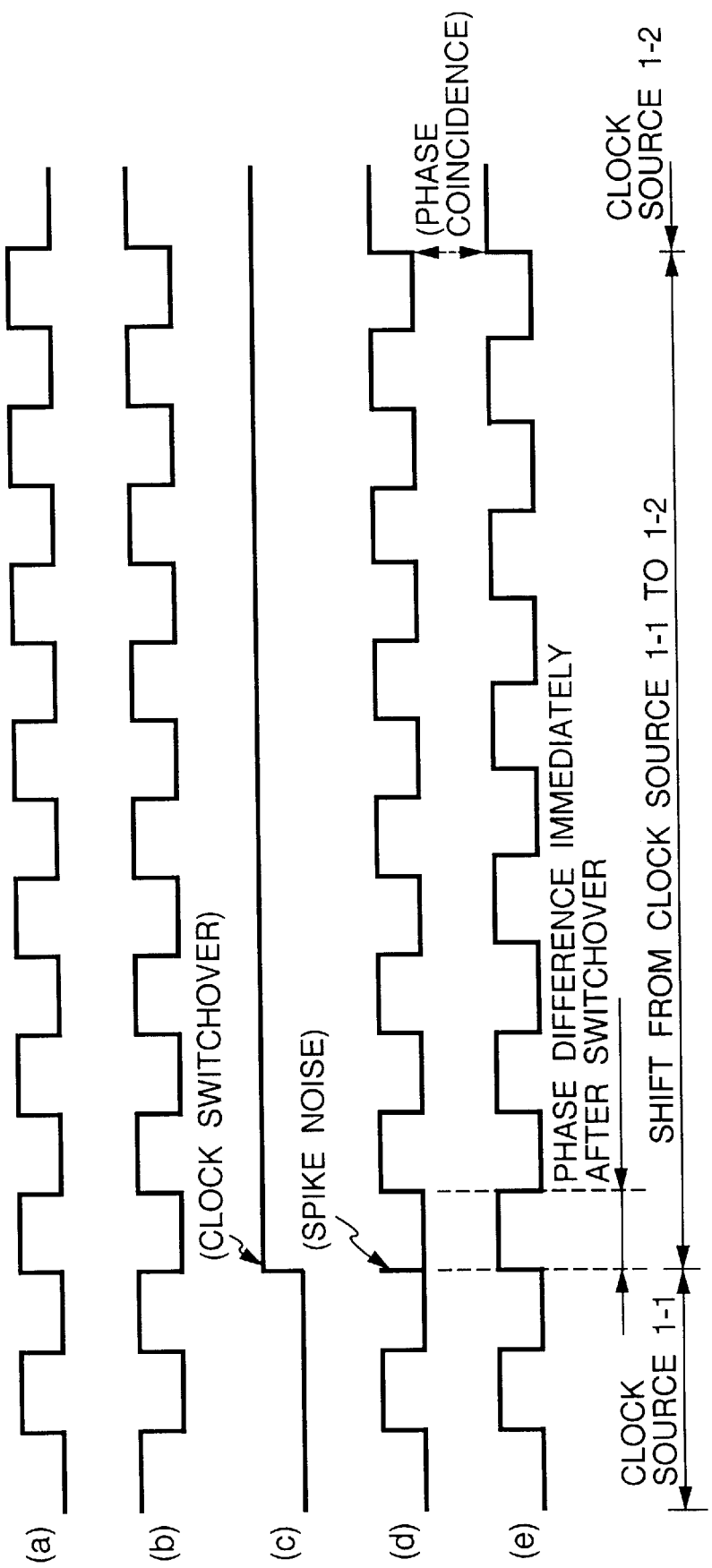
FIG. 9 is a time chart indicative of operation of the embodiment of FIG. 7.

In the drawing of FIG. 9, respective symbols denote respective outputs as follows. (a): output of clock source 1-1. (b): output of clock source 1-2, (c): input terminal 16. (d): output of selector 3-1. (e): clock output terminal 13. FIG. 9 is a time chart indicative of respective outputs at the time of switchover from clock source 1-1 to clock source 1-2 during normal operation. When a High level is input to input terminal 16 from external, selector 3 switches over its output from clock source 1-1 to clock source 1-2. The switched-over clock signal is input to the reference terminal of PLL circuit 4-1. However, since the input clock source 1-2 and the feedback signal of PLL circuit 4-1 are completely asynchronous, PLL circuit 4-1 attempts to correct a difference in phase between the reference and the feedback signals. During this attempt, since the gain of loop filter 47 in the PLL circuit used is lowered, such correcting operation is repeated so as to attain its effect gradually. Through repetition of such correcting operation with delayed effect, it becomes possible to execute clock switchover from clock source 1-1 to clock source 1-2 without affecting and being noticed by processor 5-1 at the clock supply destination in the downstream of output terminal 13 to notice. Further, since clock switchover is conducted completely asynchronous in this embodiment, there may occur a spikewise noise in an output of selector 3-1 at the instant the clock sources are switched over. However, PLL circuit 4-1 will absorb such spikewise noises, thereby processor 5-1 at the clock supply destination will not be affected by such noises.

Figure 10:
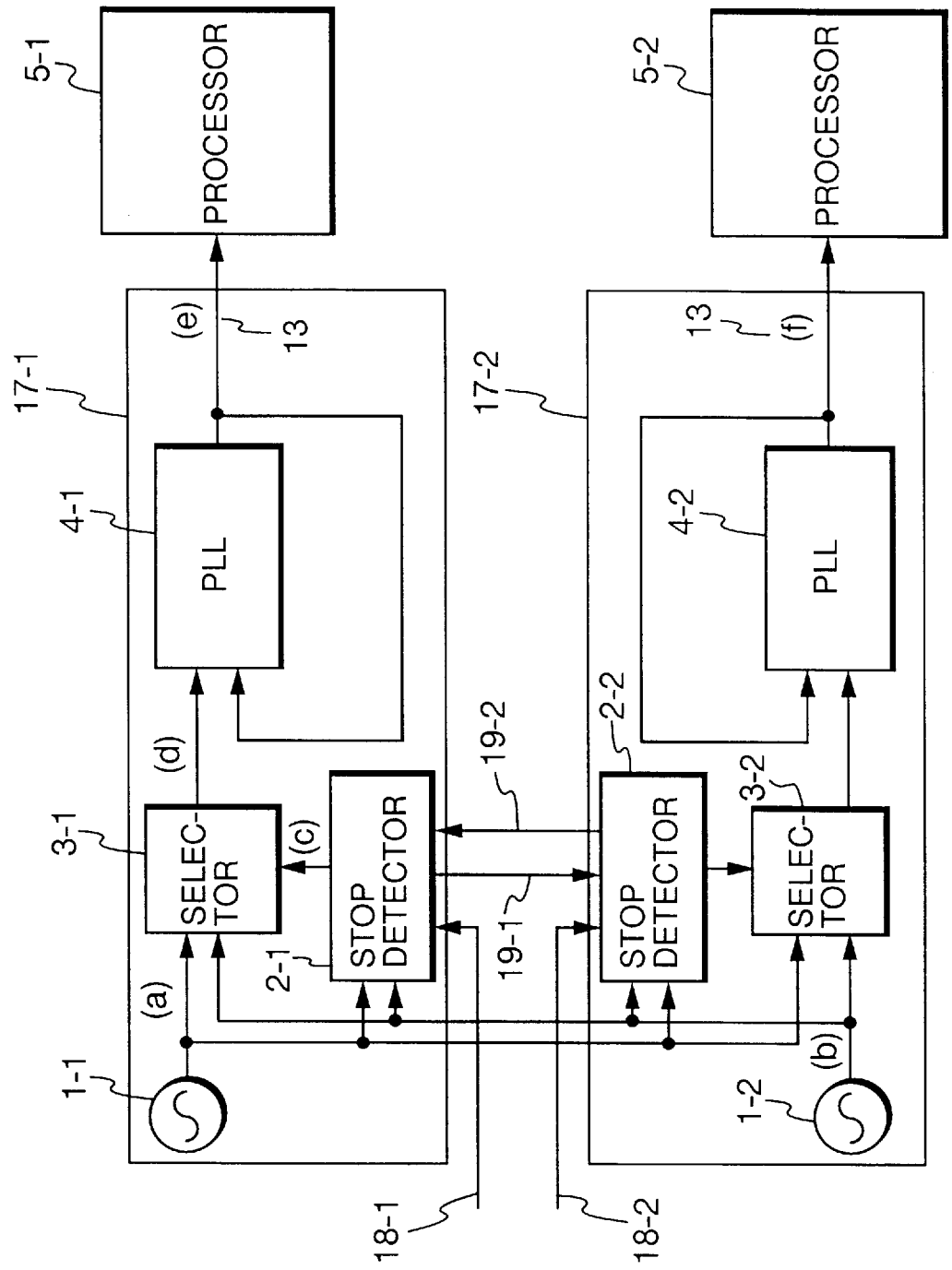
FIG. 10 is a schematic block diagram indicative of still further embodiment of the invention.

Still another embodiment of the invention is illustrated in FIG. 10, which indicates an example of stop detection operation when two or more clock circuits are being operated synchronously. By way of example, FIG. 10 indicates a schematic block diagram when two clock circuits are being operated synchronously. In the drawing of FIG. 10, respective numerals denote respective parts as follows. 17-1, 17-2: clock circuits operating in synchronism with each other. 1-1, 1-2: clock sources. 3-1: selector which selects as its output one of clock source 1-1 in 17-1 and clock source 1-2 in 17-2. 2-1: stop detection circuit which monitors the oscillation condition of clock source 1-1 in 17-1 with reference to clock source 1-2 in 17-2. 2-2: stop detection circuit which monitors the oscillation condition of clock source 1-2 in 17-2 with reference to clock source 1-1 in 17-1. 19-1, 19-2: stop detection signals exchanged between respective stop detection circuits to notify a stop condition detected thereby. Further, 4-1,4-2 denote PLL circuits, and an output thereof is put out from output terminal 13 to be supplied to processors 5-1, 5-2. 18-1, 18-2 are input terminals to supply signals to set initial conditions in stop detection circuits 2-1, 2-2.

When two clock circuits are adapted to operate in synchronism with each other, the synchronous operation is accomplished by using either one of the outputs from the two clock sources as a common clock. Such synchronous operation will be described with reference to FIG. 12 in the following.

Figure 12:
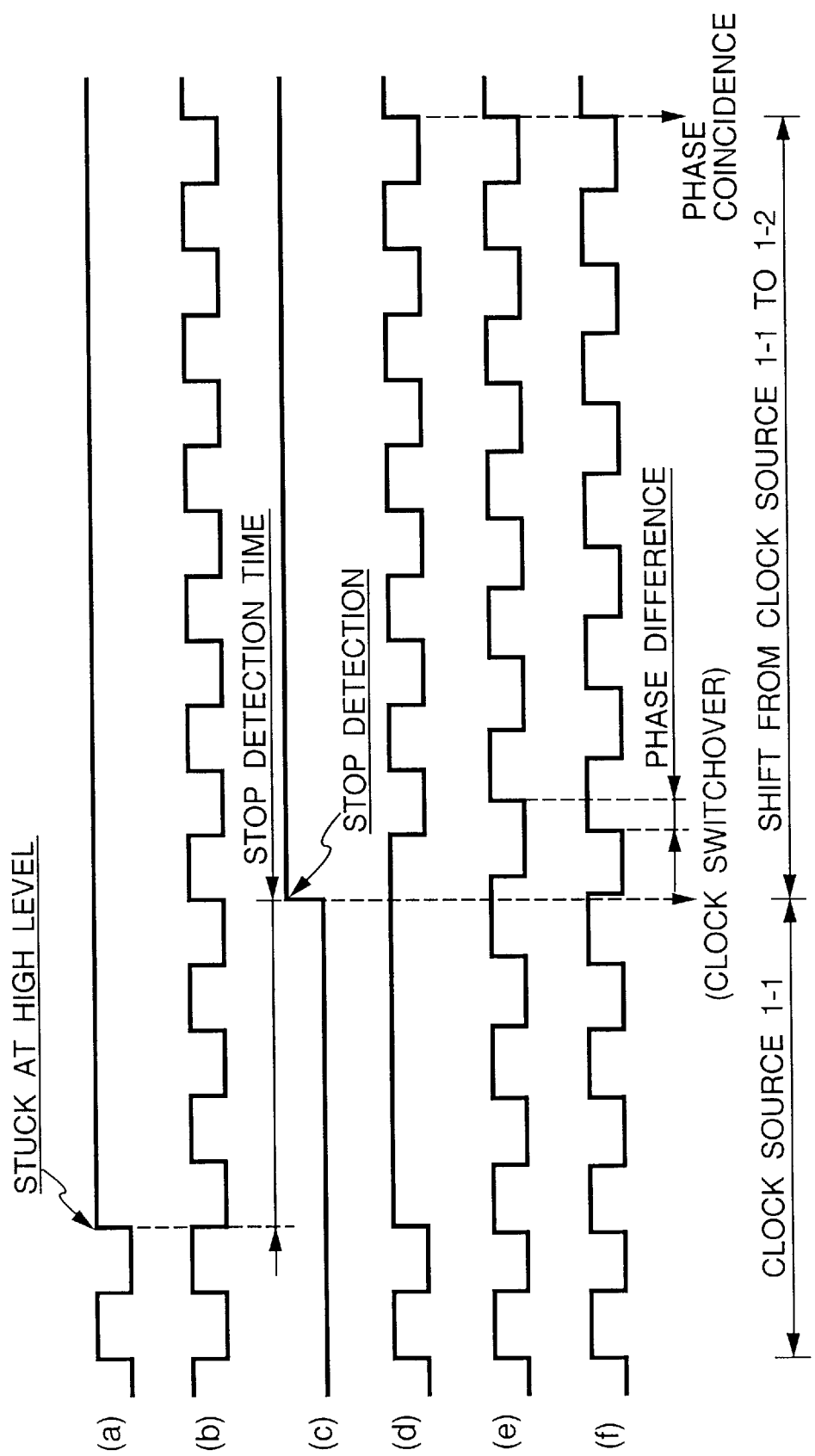
FIG. 12 is a time chart indicative of operation of the still further embodiment of FIG. 10.

In the drawing of FIG. 12, respective symbols denote respective outputs as follows. (a): output of clock source 1-1 in 17-1. (b): output of clock source 1-2 in 17-2. (c): output of stop detection circuit 2-1 in 17-1. (d): output of selector 3-1 in 17-1. (e): clock output terminal 13 of 17-1. (f): clock output terminal 13 of 17-2. FIG. 12 is a time chart indicative of stop detection and switchover operations at an event when clock source 1-1 in 17-1 which has been selected by input terminals 18-1, 18-2 fails at a High level. When clock source 1-1 in 17-1 fails at a High level, stop detection circuit 2-1 in 17-1 detects stoppage of clock source 1-1 and notifies stop detection circuit 2-2 in clock circuit 17-2 of the stoppage of the clock source 1-1 in 17-1 by stop detection signal 19-1. Then, in response to this signal, both of the clock circuits change the outputs of selectors 3-1, 3-2 to clock source 1-2 of 17-2. Subsequent operations of respective clock circuits 17-1 and 17-2 are the same as in the preceding embodiment of the invention, however, since there inevitably exists some difference or scatter in properties in respective PLL circuits depending on respective products, there may arise a difference transiently between 17-1 and 17-2 immediately after clock source switchover or in the process of pulling-in of a phase difference between the reference and the feedback signals. Therefore, there occurs that synchronous operation between respective clock circuits is not ensured during phase adjustment. However, when correction of the phase difference therebetween is completed finally, the two clock circuits can be put into operation in synchronism with each other without requiring any additional synchronous processing.

Figure 11:
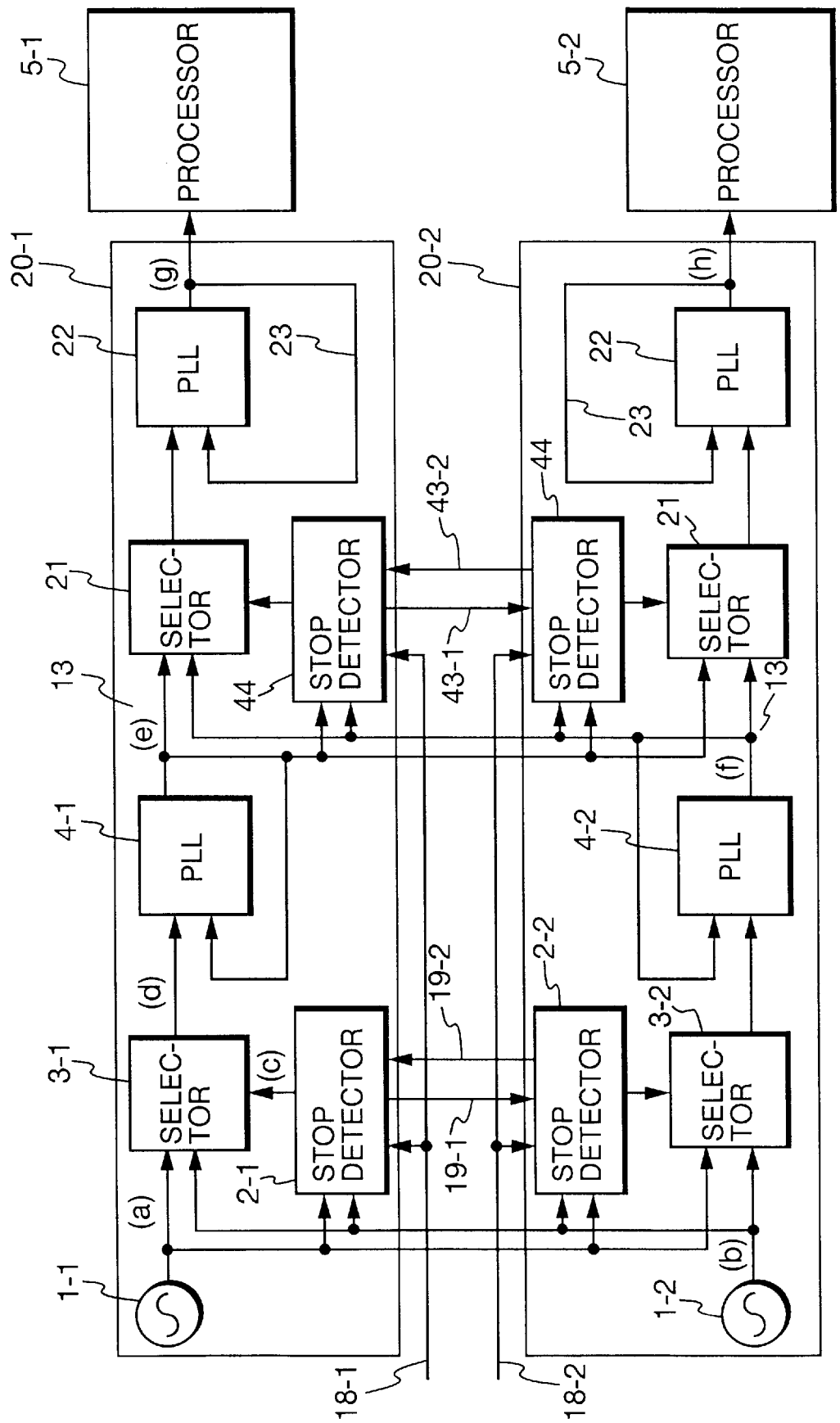
FIG. 11 is a schematic block diagram indicative of still more embodiment of the invention.

FIG. 11 is a still another embodiment of the invention using two or more clock circuits operable in synchronism with each other and stop detection operation thereof. More specifically, FIG. 11 illustrates a schematic block diagram of a clock switchover circuit which switches between the two or more clock circuits operating in synchronism with each other. In the drawing of FIG. 11, respective numerals denote respective components as follows. 1-1, 1-2: clock sources. 3-1, 3-2: selectors for selecting either one of clock sources 1-1 of 20-1 and 1-2 of 2-2 as their output. 2-1: stop detection circuit which monitors oscillation conditions of clock source 1-1 in 20-1 with reference to clock source 1-2 of 20-2. 2-2: stop detection circuit which monitors oscillation conditions of clock source 1-2 in 20-2 with reference to clock source 1-1 of 20-1. 19-1, 19-2: stop detection signals indicative of stop detection conditions of stop detection circuits 2-1, 2-2 to be transmitted to the other stop detection circuit. 4-1, 4-2: PLL circuits, and 13 their output. 44: stop detection circuit which monitors output conditions of PLL circuit 4-1 in 20-1 with reference to an output of PLL circuit 4-2 of 20-2, or that which monitors output conditions of PLL circuit 4-2 in 20-2 with reference to an output of PLL circuit 4-1 of 20-1. 43-1, 43-2: stop detection signals indicative of stop detection conditions of stop detection circuit 44 to be transmitted to the other stop detection circuit 44. 22: second stage PLL circuit, the output of which 23 is supplied to processors 5-1 or 5-2. And, 18-1, 18-2: input terminals for inputting signals to stop detection circuits 2-1, 2-2 and stop detection circuit 44 for setting their initial states.

When two clock circuits are adapted to operate in synchronism with each other, a synchronous operation therebetween is ensured by sharing the output of either one of the two clock sources as a common clock source. Their operation will be described with reference to FIG. 13 in the following.

Figure 13:
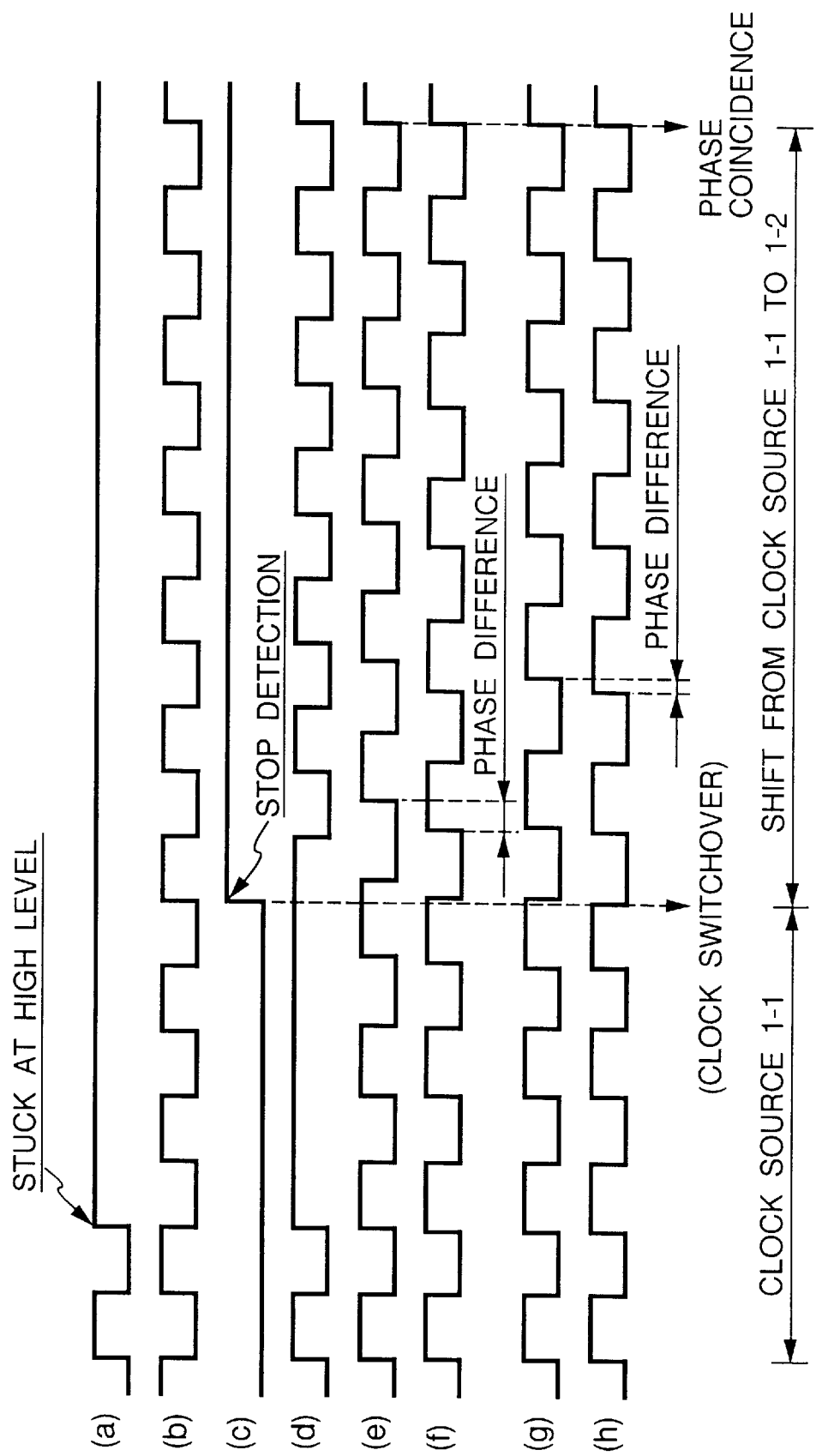
FIG. 13 is a time chart indicative of operation of the still more embodiment of FIG. 11.

In the drawing of FIG. 13, respective symbols denote respective outputs as follows. (a): output of clock source 1-1 in 20-1. (b): output of clock source 1-2 in 20-2. (c): output of stop detection circuit 2-1 of 20-1. (d): output of selector 3-1 of 20-1. (e): output 13 of PLL circuit 4-1 of 20-1. (f): output 13 of PLL circuit 4-2 of 20-2. (g): output 23 at output terminal of 20-1. (h): output 23 at output terminal of 20-2. FIG. 13 is a time chart indicative of stop detection and clock switchover operations at the time, while clock source 1-1 of 20-1 and the output of PLL circuit 4-1 of 20-1 are selected by input terminals 18-1, 18-2, when the clock source 1-1 in 20-1 fails at its high state. Upon detection of the failure at the high state of clock source 1-1 in 20-1, stop detection circuit 2-1 in 20-1 produces stop detection signal 19-1 to stop detection circuit 2-2 of clock circuit 20-2 to notify stoppage of the clock source in use. Then, both clock circuits cause selectors 3-1, 3-2 to switch over their outputs from the faulty clock source 1-1 to clock source 1-2 of 20-2. Subsequent operations in respective clock circuits 20-1, 20-2 up to the PLL circuits are the same as the preceding embodiment of the invention. However, due to a difference in properties of respective PLL circuits depending on respective production lots or the like, there occurs a transient difference between 20-1 and 20-2 immediately after switchover of clock sources or in pull-in process for canceling the phase difference between the reference signal and feedback signal at the entry of PLL circuit. In this embodiment of the invention, second stage PLL circuits are provided in order to minimize such transient phase difference. Further, reference inputs thereto are supplied by selectors 21, and from the facts that since both 20-1 and 20-2 are supplied with an output from PLL circuit 4-1 of 20-1 by initial value set terminals 18-1, 18-2, a transient phase difference between PLL circuits of 20-1 and 20-2 can be canceled, and that since the output from PLL circuit 4-1 of 20-1 the fluctuation amount of which has been suppressed therein can be input to the second stage PLL circuits 22 in 20-1 and 20-2, a phase difference at output terminals 23 between 20-1 and 20-2 can be further suppressed, thereby synchronous operation between the two clock circuits can be ensured even in the pull-in process for reducing the phase difference as well as frequency difference due to switchover operation, without affecting nor being noticed by processors 5-1, 5-2 at the clock supply destination of such switchover.

The above description regarding FIG. 13 was focused on the switchover operation between clock sources at the time one of the clock sources failed while ensuring synchronous operation, however, it is not limited thereto, and the synchronous operation can be ensured even at the time PLL circuit 4-1 fails. For example, should PLL circuit 4-1 of 20-1 fail, and when stop detection circuit 44 in 20-1 detects stoppage of PLL circuit 4-1 in 20-1, the same produces stop detection signal 43-1 to stop detection circuit 44 in clock circuit 20-2 to notify interruption of PLL circuit 4-1. Then, both the clock circuits switch over the outputs of their selectors 21 to PLL circuit 4-2 of 20-2. It should be noted that with respect to reference inputs to PLL circuits 22, clock continuity will be distorted during a period of time from stoppage of PLL circuit 4-1 in 20-1 to switchover to PLL circuit 4-2 of 20-2, however, clock continuity can be ensured by the output of PLL circuit 22 by rendering its response characteristic to become overdamping, and since the output of PLL circuit 4-2 of 20-2 which enters PLL circuits 22 was in the same phase with the output of PLL circuit 4-1 of 20-1 present before its stoppage, a phase change due to clock source switchover can be minimized without distorting the synchronous operation between clock circuits 20-1 and 20-2.

This embodiment of the invention has been described hereinabove with respect to clock switchover operation after detection of stoppage of one of clock sources, however, it is not limited thereto, and this can be applied for ensuring synchronous operation of two different clock circuits operating normally but subjected to interclock switching as well likewise the stop detection operation described above, without affecting nor being noticed by processor 5-1 at the clock supply destination of such clock switchover operation.

Figure 14:
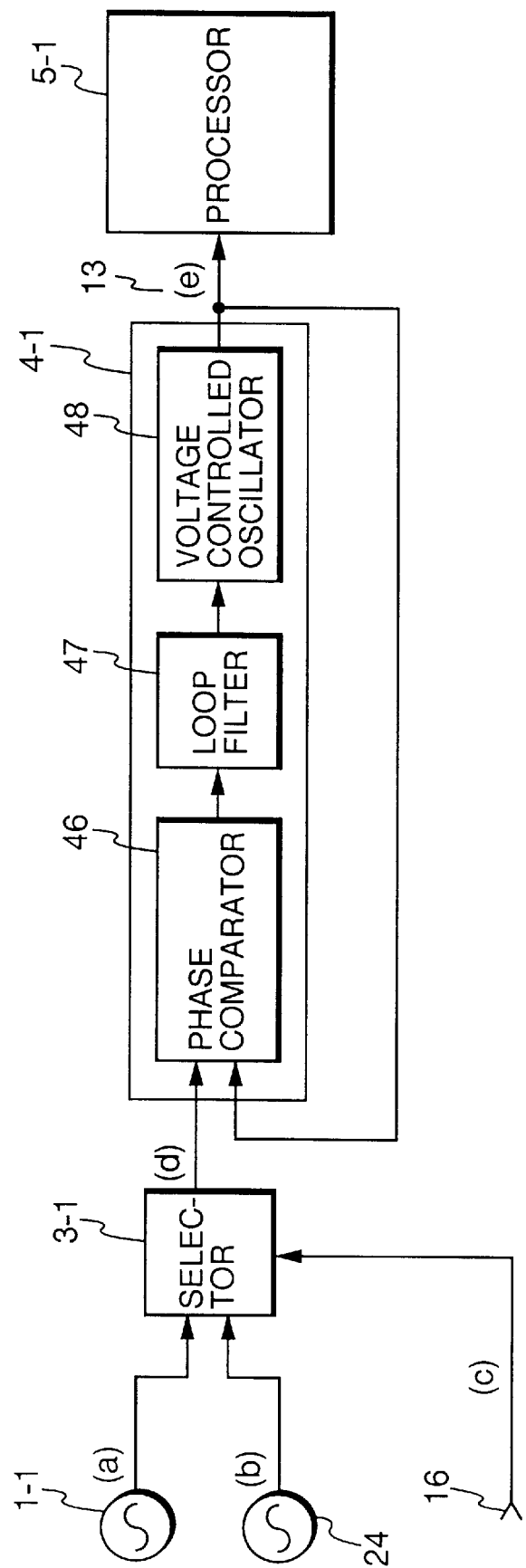
FIG. 14 is a schematic block diagram indicative of another embodiment of the invention.

FIG. 14 is a schematic block diagram of a clock switchover circuit directed to on-line field up-grade of still another embodiment of the invention.

In the drawing of FIG. 14, numeral 24 denotes a clock source which outputs up-grading clock. Clock switchover operation thereof will be described with reference to FIG. 15 in the following.

Figure 15:
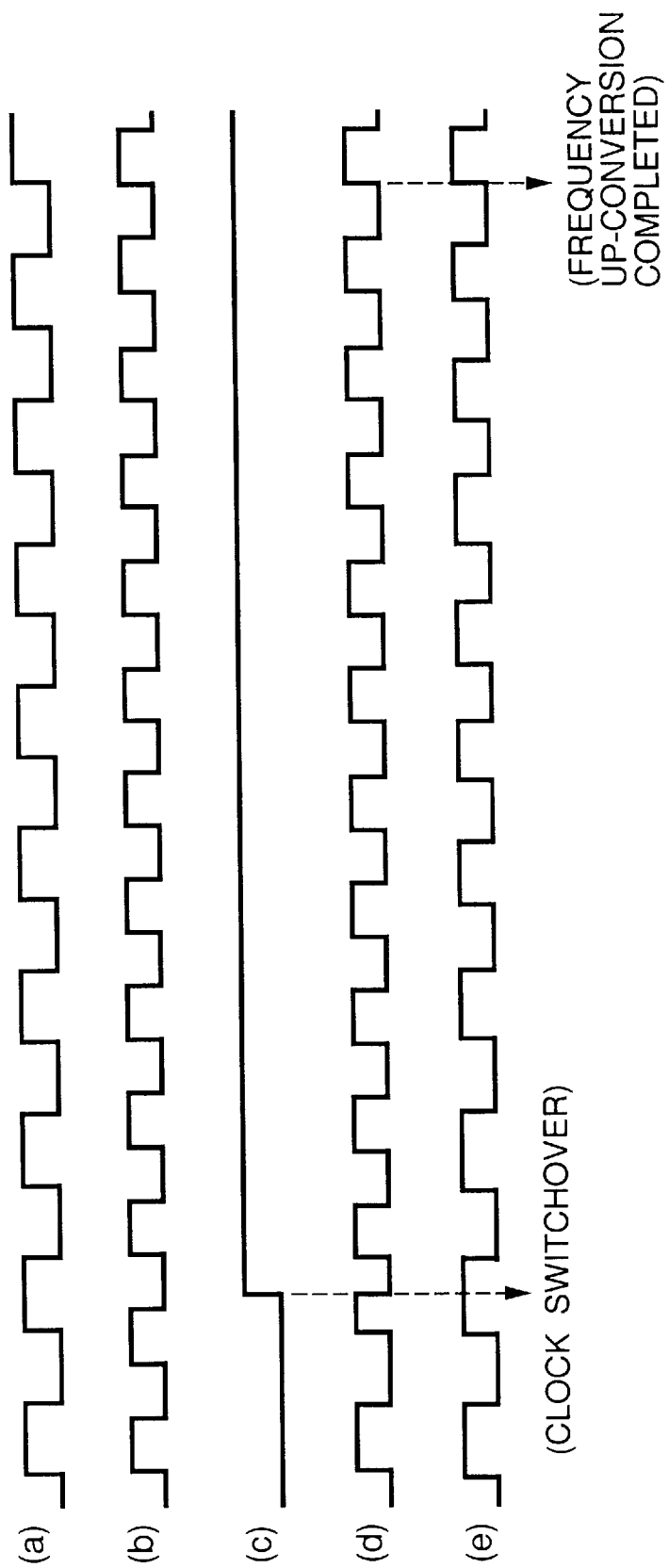
FIG. 15 is a time chart indicative of operation of the another embodiment of FIG. 14.

In the drawing of FIG. 15, respective symbols denote respective outputs as follows. (a): output of clock source 1-1. (b): output of clock source 1-24. (c): input terminal 16. (d): output of selector 3-1. (e): clock output terminal 13. FIG. 15 is a time chart indicative of normal clock switchover operation switching from clock source 1-1 to clock source 24 in a normal state. When a high level is input to input terminal 16 from external, selector 3-1 switches over its output from clock source 1-1 to clock source 24. The signal selected enters PLL circuit 4-1 as its reference signal. Since the entered clock signal and a feedback signal of PLL circuit 4-1 are asynchronous, and their frequencies per se are different, PLL circuit 4-1 attempts at first to correct a frequency difference between the reference signal and the feedback signal. This frequency correction is effected slowly by repetition thereof by means of loop filter 47 in the PLL circuit since the gain of the loop filter was lowered. When the frequency correction is completed, then, a phase correction operation for correcting a phase difference between the reference and the feedback signals is executed slowly in repetition until the phase of the feedback signal coincides with that of the reference signal, thereby a desired frequency up-conversion operation is completed. Through this correction operation taking place gradually over a few cycles, clock frequency up-converting can be realized without permitting processor 5-1 at the clock supply destination in the subsequent stage of output terminal 13 to notice the switchover from clock source 1-1 to clock source 24.

By way of example, a frequency down-converting can be realized likewise the frequency up-converting described above.

Figure 16:
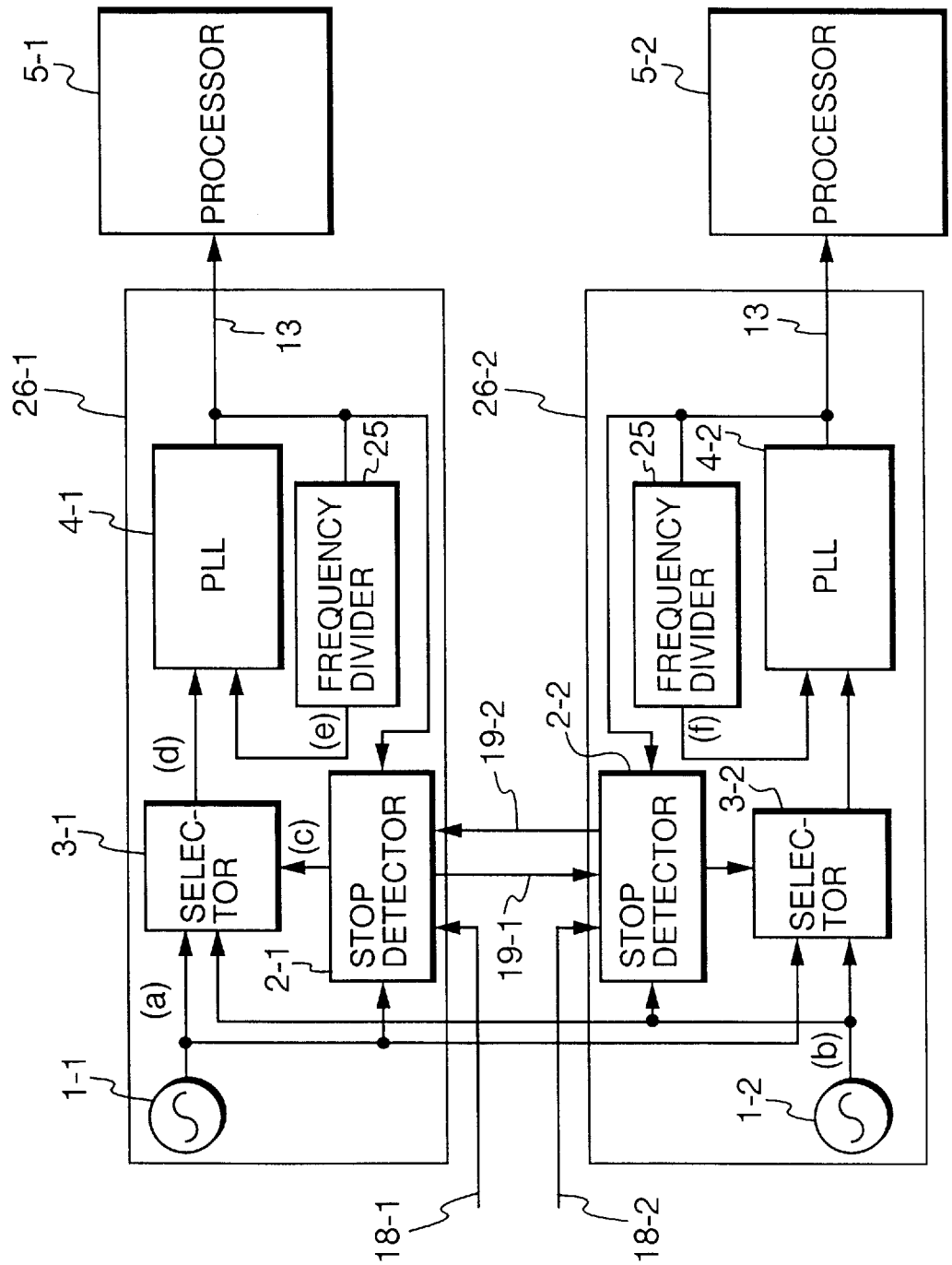
FIG. 16 is a schematic block diagram indicative of still another embodiment of the invention.

With reference to FIG. 16, a stop detection operation in an arrangement including two or more clock circuits according to another embodiment of the invention operating in synchronism with each other will be described. FIG. 16 indicates a schematic block diagram of a clock switchover circuit capable of executing a high speed stop detection operation when two or more clock circuits are operating in synchronism with each other. In the drawing of FIG. 16, respective numerals denote respective components as follows. 26-1, 26-2: clock circuits operating in synchronism. 1-1, 1-2: clock sources. 3-1, 3-2: selectors for selecting either one of the clock sources 1-1 in 26-1 and 1-2 in 26-2 as their outputs. 2-1, 2-2: stop detection circuits which monitor oscillation conditions of clock sources 1-1, 1-2 with reference to output terminal 13. 19-1, 19-2: stop detection signals indicative of stop detection conditions detected by stop detection circuits 2-1, 2-2 to be transmitted to the other stop detection circuits. 4-1, 4-2: PLL circuits, through the output terminal thereof outputs 13 are supplied to processors 5-1, 5-2 as their clock signals. 25: frequency dividers which divide clock signals from output terminal 13 to feedback to PLL circuits 4-1, 4-2. 18-1, 18-2: input terminals through which enter signals for setting initial states of stop detection circuits 2-1, 2-2. One of the features of this embodiment of the invention resides in an addition of feedback frequency divider 25. In order to adapt the phase and frequency of a feedback signal to coincide with those of the reference signal at the input terminal of PLL circuits due to the characteristics of PLL per se, an output at output terminals 13 of PLL circuits 4-1, 4-2 has a frequency obtained by multiplying the frequency of the reference signal by a factor of division (for example, by integer 4 in case a quarter frequency divider is used). In this embodiment of the invention, stop detection is executed using this multiplied frequency obtained by multiplying by the factor of division. An example of such stop detection circuit is indicated in FIG. 18.

Figure 18:
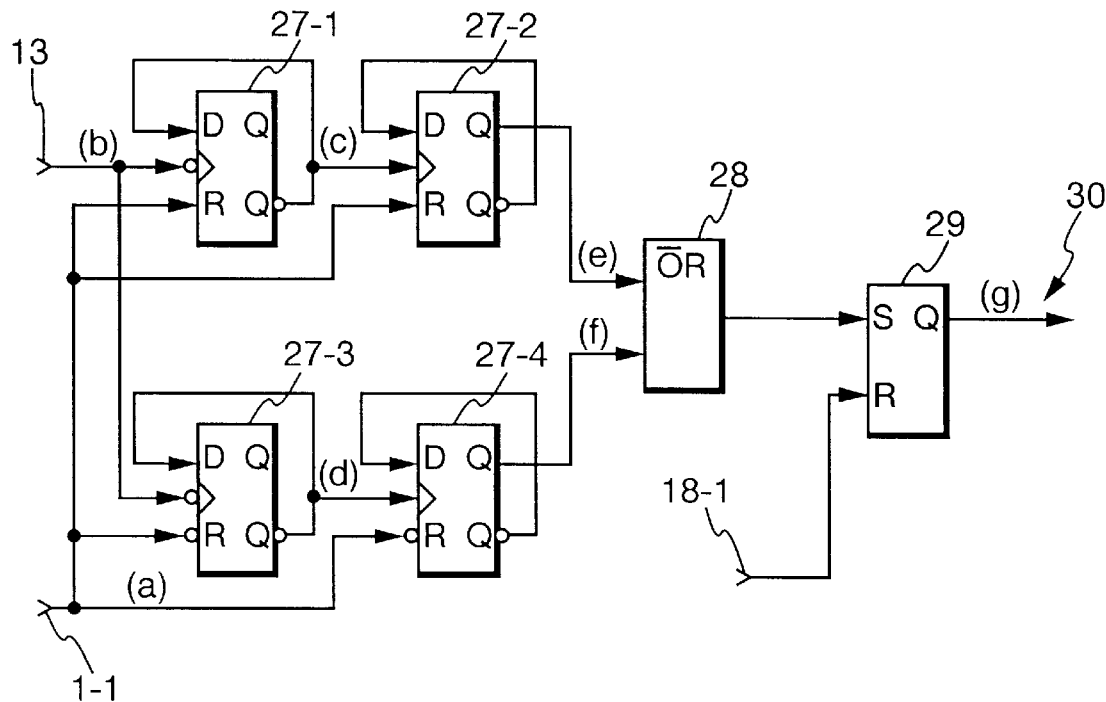
FIG. 18 is a schematic block diagram of an example of a stop detection circuit for use in the embodiments of the invention.

In the drawing of FIG. 18, respective numerals denote respective components as follows. 13: output terminal. 1-1: clock source. 27-1, 27-2, 27-3, 27-4: ripple carry counters which start counting triggered by a drop in output terminal 13, wherein ripple carry counters 27-1, 27-2 are adapted to reset at a high level of clock source 1, and serve to detect a low level failure of clock source 1, while ripple carry counters 27-3, 27-4 are adapted to reset at a low level of clock source 1, and serve to detect a high level failure of clock source 1. 28: OR circuit for executing OR operation in response to outputs from ripple carry counters 27-2, 27-4. 29: SR flip-flop circuit for holding status of OR circuit 28. 30: output terminal through which an output from SR flip flop 29 is produced to a clock switch circuit. Sequences of such operations will be explained with reference to FIG. 19 in the following.

Figure 19:
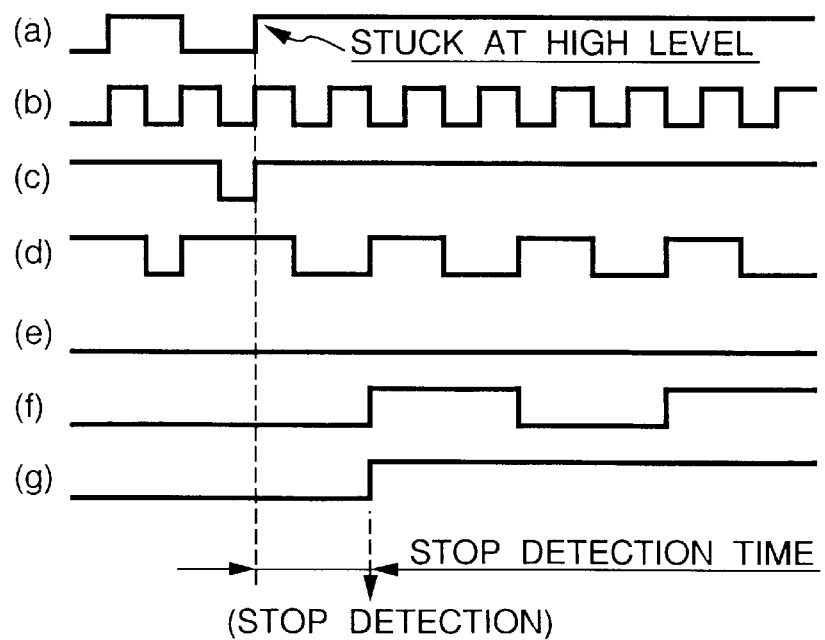
FIG. 19 is a time chart indicative of operation of the stop detection circuit of FIG. 18.

In the drawing of FIG. 19, respective symbols denote respective outputs as follows. (a): clock source 1-1 of FIG. 16. (b): output terminal of FIG. 16. (c): output of ripple carry counter 27-1 of FIG. 18. (d): output of ripple carry counter 27-3. (e): output of ripple carry counter 27-2. (f): output of ripple carry counter 27-4. (g): output terminal 30 of FIG. 18. FIG. 19 is a time chart indicative of respective outputs during a stop detection operation when clock source 1-1 failed to a high level. In this example, the frequency of output terminal 13 is multiplied twofold.

With reference to FIG. 19, in a normal operating condition using an input from PLL circuit 4-1, since the phases and frequencies between the reference signal and the feedback signal at the entry of PLL are in coincidence, a rising edge of pulses from output terminal 13 the frequency of which has been doubled corresponds to a rising or falling edge of pulses of clock source 1-1. Thereby, at each falling edge of output terminal 13, each level of clock source 1-1 corresponding thereto can be detected. However, since clock source 1 repeats high and low levels alternately in the normal operation, ripple carry counters 27-2, 27-4 will not count up. In the case when clock source 1-1 fails to a high level, ripple carry counters 27-1, 27-2 go to a reset state while ripple carry counters 27-3, 27-4 are enabled to count up, the result of count-up is set in SR flip flop 29 as a stop detection to be output from output terminal 30. By use of this stop detection circuit of the invention, stop detection for the clock sources can be realized within one cycle. Stop detection operation using the stop detection circuit of FIG. 16 will be described more in detail with reference to FIG. 17 in the following.

Figure 17:
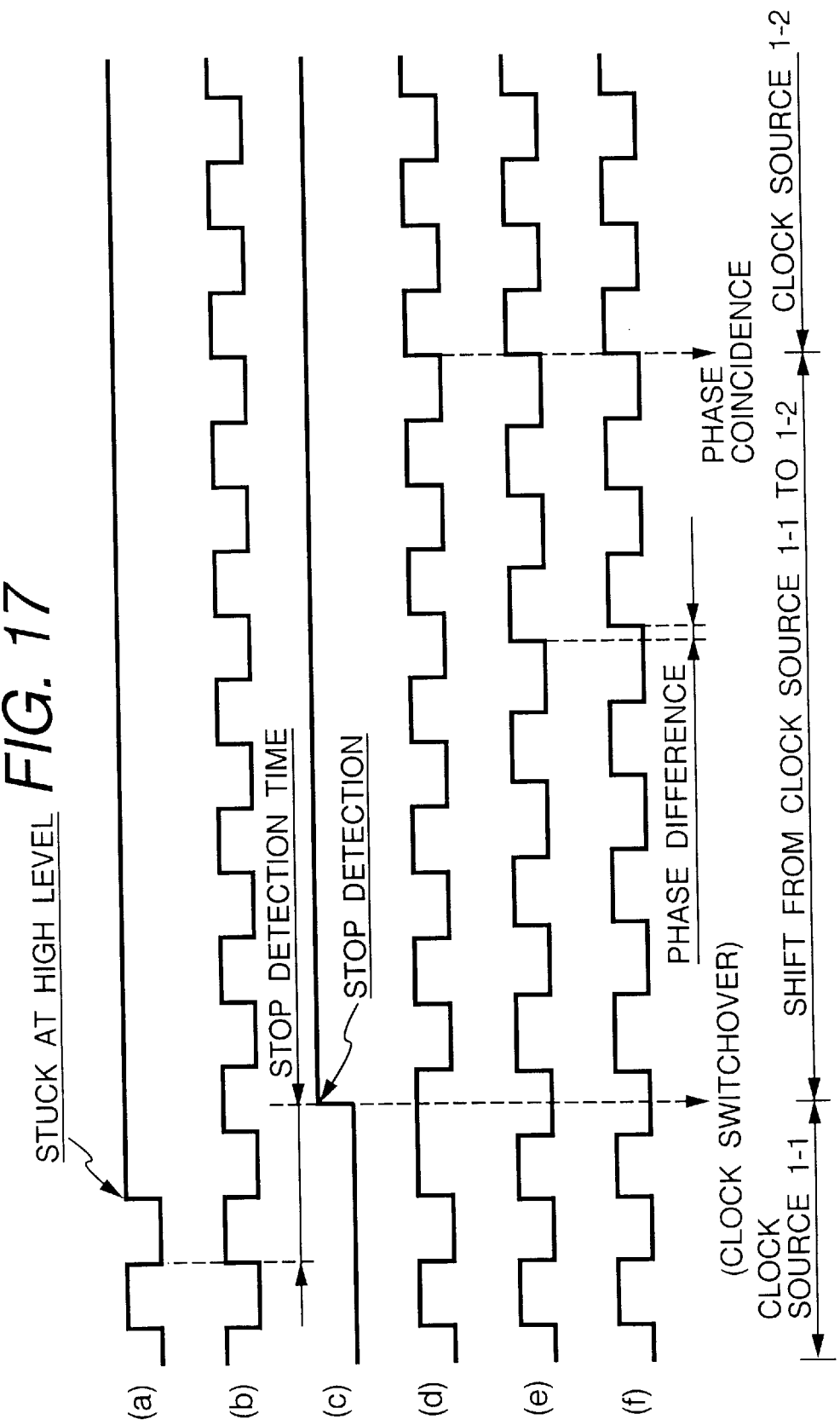
FIG. 17 is a time chart indicative of operation of the still another embodiment of FIG. 16.

In the drawing of FIG. 17, respective symbols denote respective outputs as follows. (a): output of clock source 1-1 in 26-1. (b): output of clock source 1-2 in 26-2. (c): output of stop detection circuit 2-1 of 26-1. (d): output of selector 3-1 of 26-1. (e): output of frequency divider 25 of 26-1. (f): output of frequency divider 25 of 26-2. FIG. 17 is a time chart indicative of stop detection and clock switchover operations when a high level failure occurred in clock source 1-1 in 26-1 which was selected for use by input terminal signals 18-1, 18-2. Upon detection of a failure to a high level in clock source 1-1, stop detection circuit 2-1 in 26-1 produces stop detection signal 19-1 to the stop detection circuit 5 in clock circuit 26-2 notifying the stoppage of the clock source 1-1. Then, both of the clock circuits cause their selectors 3-1, 3-2 to switch over their outputs to clock source 1-2 in 26-2. A time required for clock source switchover is substantially shortened through use of the stop detection circuit of FIG. 18, thereby, with reference to FIG. 17, a fast clock source switchover is realized in a short time only with an extension of a half cycle or so of the high state in the output of selector 3-1. Subsequent operations thereafter are the same as in the preceding embodiment of the invention. However, since the time until stop detection is shortened substantially, a state of PLL circuit without input of reference signals persists only a very short period that can be ignored, thus the clock input can be switched over before the output of PLL circuit changes, therefore requiring correction only of the phase difference. Thereby, the time required for completing correction can be substantially reduced. Further, immediately upon completion of correction, the two clock circuits can be put into operation in synchronism with each other without any other synchronous processing.

Figure 22:
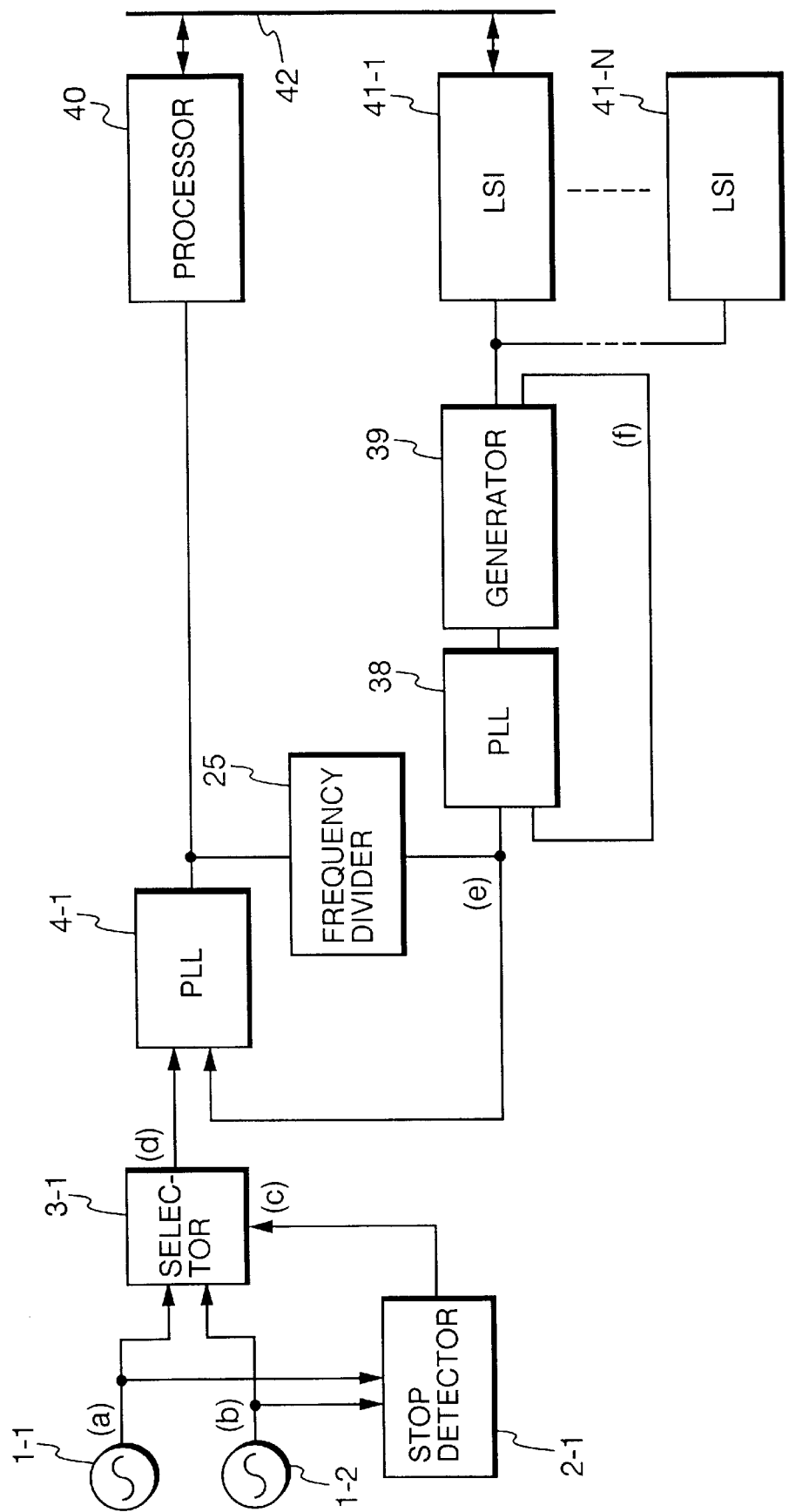
FIG. 22 is a schematic block diagram indicative of a clock distribution system according to the invention.

FIG. 22 is a still another embodiment of the invention indicative of an example of a clock distributing system. The drawing of FIG. 22 illustrates a schematic block diagram of an arrangement for distributing clock signals to a processor and respective LSIs. In the drawing of FIG. 22, respective numerals denote respective components as follows. 1-1: clock source. 1-2: another clock source which produces a same clock signal as clock source 1-1. 3-1: selector which selects either one of clock sources 1-1 and 1-2 for its output. 2-1: stop detection circuit which monitors the oscillation condition of clock source 1-1 with reference to clock source 1-2. 4-1: PLL circuit the output of which is supplied to processor 40 as its clock signal. 25: frequency divider which divides the output of PLL circuit 4-1, then, a part of which is supplied to PLL circuit 4-1 as its feedback signal. 38: a second stage PLL circuit operating in response to the output of frequency divider 25. An output from the second stage PLL circuit 38 enters clock generation circuit 39, and an output therefrom is branched and distributed to a plurality of LSIs 41-1 to 41-N. Further, part of the output from clock source circuit 39 is supplied to PLL circuit 38 as a feedback signal. 42 denotes a bus connecting between processor 40 and LSI 41-1. Each object of the two PLL circuits is different from the other. The object of the first stage PLL circuit 4-1 is to suppress a rapid and transient phase change during clock switchover operation likewise the preceding embodiment of the invention, while the object of the second stage PLL circuit 38 is to cancel a delay scatter in clock generation circuit 39 due to a product lot or property thereof.

In order for this distribution system to be able to supply the same clock in the same condition constantly without need to initialize frequency divider 25 and clock source circuit 39, it is necessary to make the frequencies of feedback signals of the PLL circuits 4-1 and the frequency of clock sources 1-1 or 1-2 to coincide with the frequency of a lowest clock among LSI 41-1 to LSI 41-N at the clock supply destination. For example, assume a clock to the processor 40 to be 100 MHz and the lowest clock to one of LSIs to be 25 MHz, then frequencies of feedback signals from PLL circuits 4-1 and 38, and of clock sources 1-1, 1-2 will have to be 25 MHz, thereby frequency divider 25 needs to be a quarter frequency divider. Further, although the frequencies of feedback signals of PLL circuits 4-1 and 38 are the same, separate feed back loops are provided respectively so that each PLL circuit feeds back its own output as its own feed back signal, in order to prevent interference therebetween. The operation by this arrangement will be described with reference to FIG. 23.

In the drawing of FIG. 23, respective symbols denote respective outputs as follows. (a): output of clock source 1-1. (b): output of clock source 1-2. (c): output of stop detection circuit 2-1. (d): output of selector 3-1. (e): output of frequency divider 25, which is a feedback signal to PLL circuit 4-1. (f): output signal of clock source 39, which is a feedback signal to PLL circuit 38. FIG. 23 is a time chart indicative of respective outputs during a stop detection of a failure in clock source 1-1 to the high level, and subsequent clock switchover operation. When clock source 1-1 fails to the high level, stop detection circuit 2-1 detects stoppage of clock source 1-1, then the same informs selector 3-1 to switch over its output from the failed clock to clock source 1-2. An output from PLL circuit 4-1 subjected to the gradual correction enters the reference terminal of PLL circuit 38, however, since an output of PLL circuit 38 will not respond thereto quickly enough, there occurs a transient phase difference as indicated in FIG. 23 between the outputs (e) and (f) resulting from the clock source switchover. Since this phase difference causes a direct phase difference between processor 40 and LSI 41-1, should this phase difference become greater than an allowance in transfer margin therebetween, the normal operation of the system will be hampered. This hampering must be prevented, for example, by increasing the gain of a loop filter in PLL circuit 38 in this clock distributing system thereby to enable a faster response by PLL circuit 38 so that the transient phase difference can be minimized.

Figure 20:
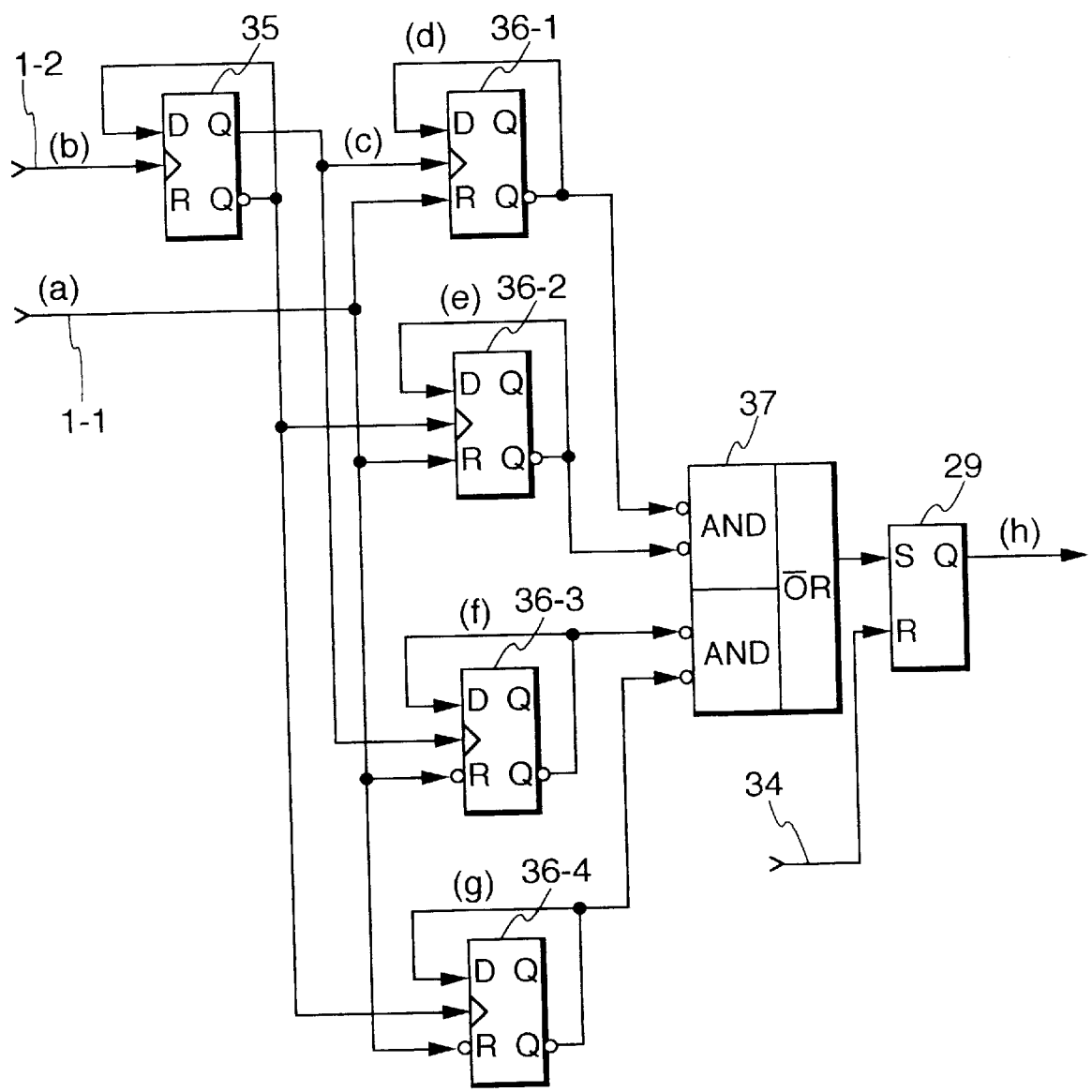
FIG. 20 is a schematic block diagram indicative of another embodiment of the stop detection circuit of the invention.

FIG. 20 is an example of a stop detection circuit for detecting stoppage of clock source 1-1 with reference to clock source 1-22, which can detect the clock stoppage faster according to the invention.

In the drawing of FIG. 20, numerals and symbols denote as follows. 1-1: input from clock source 1-1. 1-2: input from clock source 1-2. 35: frequency divider which divides clock source 1-2 by integer two. 36-1, 36-2, 36-3, 36-4: ripple carry counters which start counting up triggered by frequency divider 35, wherein 36-1 and 36-2 are adapted to reset by a High level of clock source 1-1 thereby serving as a Low failure detection of clock source 1-1, while 36-3 and 36-4 are adapted to reset by a Low level of clock source 1-1 thereby serving as a High level failure detection of clock source 1-1. 37: AND-OR circuit which executes AND-OR operation in response to outputs from ripple carry counters 36-1, 36-2, 36-3 and 36-4, a result of which is set in SR flip flop 29 for detection of stoppage of clock. 34: terminal for setting initial value in SR flip flop 29. The operation of FIG. 20 will be described with reference to FIG. 21 in the following.

Figure 21:
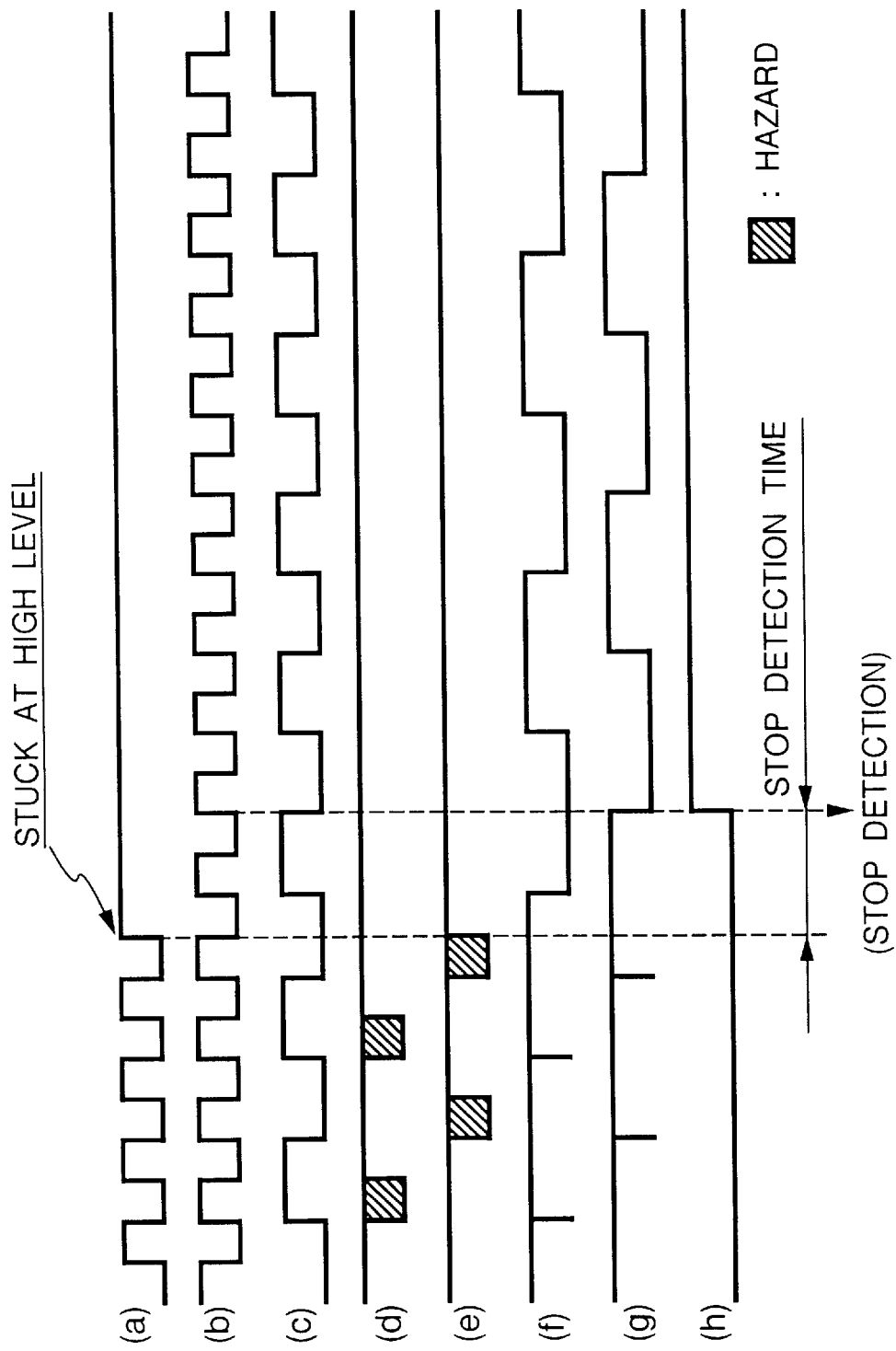
FIG. 21 is a time chart indicative of operation of the stop detection circuit of FIG. 20.

In the drawing of FIG. 21, respective symbols denote respective inputs or outputs as follows. (a): input from clock source 1-1. (b): input from clock source 1-2. (c): output of frequency divider 35. (d): output of ripple carry counter 36-1. (e): output of ripple carry counter 36-2. (f): output of ripple carry counter 36-3. (g): output of ripple carry counter 36-4. (h): output of SR flip flop 29. Here, the drawing of FIG. 21 indicates a time chart illustrative of respective outputs when clock source 1-1 failed to a High level.

With reference to FIGS. 20 and 21, ripple carry counters 36-1, 36-3 start a count up triggered by a rise in an output Q of frequency divider 35, and ripple carry counters 36-2, 36-4 start a count up triggered by a rise in an output Qn of frequency divider 35. However, since clock source 1-1 has a faster cycle than that of the frequency divider 35 during the normal operation, AND operation between outputs from ripple carry counter 36-1 and 36-2, or between outputs from 36-3 and 36-4 is not enabled. When clock source 1-1 fails to High level, ripple carry counters 36-1 and 36-2 assume a reset state, while ripple carry counters 36-3 and 36-4 start counting up until they satisfy the condition of AND-OR circuit 37, and which output is set in the SR flip flop 29. This is the condition in which stop detection is made. In the case of FIG. 20 of the invention, it is possible to detect a clock failure faster by one cycle than the conventional clock fault detection circuit.

Further, according to another example of PLL circuits in which the gain of its loop filter is lowered as has been described hereinabove, more particularly in a PLL circuit of a frequency multiplication type multiplying by a factor of 12 which oscillates 180 MHz as its output frequency in response to a reference frequency of 15 MHz, assume that the gain of a phase comparator is 0.16 V/rad, the gain of a voltage control oscillator is 53.3 MHz/V, and a loop filter used is an active type low-pass filter. Then, in the arrangement above, by lowering the cutoff frequency of the low-pass filter down to 160 Hz when the attenuation of which is set at −20 dB/dec, a cyclic fluctuation in the output from the PLL circuit due to clock source switchover can be suppressed within 2% maximum, and the time required for pulling-in the phase difference can be suppressed within 5–6 μs maximum.

According to the present invention as has been described hereinabove, in the clock circuit operating on a clock signal which can be switched over selectably between two or more clock sources, by inserting a PLL circuit having an overdamping pull-in characteristic obtained by lowering the gain of the loop filter thereof in the subsequent stage of the clock source switchover circuit, the stable and reliable operation can be continued advantageously at the clock supply destination without affecting the clock destination operation nor even noticing clock stoppage and clock source switchover. Further, when this clock circuit is applied to a plurality of apparatus or systems, they can be operated in synchronism with each other without a risk of interruption of clock supply. Still further, through use of this clock circuit, it becomes possible to realize the field up-grade of clock on line.

What is claimed is:

1. A clock circuit comprising a first clock source and a second clock source;

a stop detector detecting a failure in one of said first and second clock sources, wherein said clock source not experiencing a failure is used a reference clock source;

a selector switching from said clock source experiencing said failure to said reference clock source in response to an output from said stop detector;

a PLL circuit provided in a subsequent stage of said selector, wherein said PLL circuit comprises an overdamping response characteristic such that during a period of time when switching from said failed clock source to the other clock source, a glitch does not occur, and continuity of an output clock supply from said PLL circuit is assured.

2. A clock circuit as recited in claim 1, wherein said PLL circuit comprises an overdamping response characteristic so as to enable an asynchronous switching when switching over between clock sources.

3. A clock circuit as recited in claim 1, wherein said stop detector further detects a failure in one of said clock sources based on an output from said PLL circuit, wherein said output from said PLL circuit is used as the reference clock.

4. A clock circuit as recited in claim 1, wherein said stop detector further detects a failure in one of said clock sources based on using an output from said PLL circuit, wherein said output from said PLL circuit has been multiplied and is used as the reference clock.

* * * * *